(12) United States Patent
Narla et al.

(10) Patent No.: US 12,294,237 B2
(45) Date of Patent: May 6, 2025

(54) PHOTOVOLTAIC DISCONNECT DEVICE FOR STORAGE INTEGRATION

(71) Applicant: Unirac, Inc., Albuquerque, NM (US)

(72) Inventors: Sandeep Narla, Newark, CA (US); Brian Kuhn, Austin, TX (US); Kevin C. Fischer, Orinda, CA (US); Udo Uebel, San Francisco, CA (US)

(73) Assignee: Unirac, Inc., Albuquerque, NM (US)

( * ) Notice: Subject to any disclaimer, the term of this patent is extended or adjusted under 35 U.S.C. 154(b) by 30 days.

(21) Appl. No.: 18/176,137

(22) Filed: Feb. 28, 2023

(65) Prior Publication Data

US 2023/0208187 A1    Jun. 29, 2023

Related U.S. Application Data

(63) Continuation of application No. 17/324,715, filed on May 19, 2021, now Pat. No. 11,695,297.
(Continued)

(51) Int. Cl.
*H02J 13/00* (2006.01)
*H02J 9/06* (2006.01)
(Continued)

(52) U.S. Cl.
CPC ........ *H02J 9/068* (2020.01); *H02J 13/00002* (2020.01); *H02J 13/00036* (2020.01);
(Continued)

(58) Field of Classification Search
CPC ............... H02J 9/068; H02J 13/00002; H02J 13/00036; H02J 2300/24; H02J 13/00016; H02J 13/00022; H02S 10/10; H02S 40/34; H02S 40/38; Y02B 10/70; Y02B 70/30; Y02B 90/20; Y02E 10/56; Y02E 40/70; Y02E 60/00; Y02E 70/30; Y04S 10/123; Y04S 10/18; Y04S 20/12; Y04S 20/248; Y04S 40/124; Y04S 40/126
See application file for complete search history.

(56) References Cited

U.S. PATENT DOCUMENTS

| | | |
|---|---|---|
| 2003/0086228 A1 | 5/2003 | Papallo et al. |
| 2005/0105306 A1* | 5/2005 | Deng ............. H02M 5/4585 363/37 |

(Continued)

*Primary Examiner* — Daniel Cavallari
*Assistant Examiner* — Thai H Tran
(74) *Attorney, Agent, or Firm* — Lee & Hayes, P.C.

(57) ABSTRACT

The present disclosure provides a photovoltaic (PV) disconnect device used in an electrical system. The PV disconnect device includes a relay component electrically coupled to a feed circuit of a backup PV power generation system and a connector port electrically coupled to an energy control system. The PV disconnect device includes a sensor circuit to measure at least one of a voltage, a current, and a current frequency of the feed circuit of the backup PV power generation system. The PV disconnect device includes a controller operatively coupled to the relay component, the sensor circuit, and the connector port. The controller receives and processes the voltage, the current, and the current frequency measurements. The controller selectively actuates the relay component based on the processed voltage, current, and current frequency measurements.

19 Claims, 14 Drawing Sheets

Related U.S. Application Data

(60) Provisional application No. 63/144,204, filed on Feb. 1, 2021, provisional application No. 63/027,563, filed on May 20, 2020.

(51) Int. Cl.
  *H02S 10/10* (2014.01)
  *H02S 40/34* (2014.01)
  *H02S 40/38* (2014.01)

(52) U.S. Cl.
  CPC .............. *H02S 10/10* (2014.12); *H02S 40/34* (2014.12); *H02S 40/38* (2014.12); *H02J 2300/24* (2020.01)

(56) References Cited

U.S. PATENT DOCUMENTS

| | | |
|---|---|---|
| 2009/0319093 A1 | 12/2009 | Joos et al. |
| 2010/0226160 A1* | 9/2010 | Prior .................... H01H 47/002 361/170 |
| 2012/0281444 A1 | 11/2012 | Dent |
| 2013/0114302 A1* | 5/2013 | Escobar .................... H02J 3/38 363/13 |
| 2013/0263843 A1* | 10/2013 | Kreutzman ............. F24H 15/37 126/615 |
| 2014/0197966 A1* | 7/2014 | Kim ...................... G01R 22/06 340/870.25 |
| 2015/0318688 A1* | 11/2015 | Ai .......................... H02H 9/021 361/87 |
| 2016/0226255 A1 | 8/2016 | Sugeno et al. |
| 2017/0271875 A1 | 9/2017 | Narla |
| 2017/0336821 A1 | 11/2017 | Ramezan Pour Safaei |
| 2018/0048159 A1 | 2/2018 | Narla et al. |
| 2018/0123348 A1 | 5/2018 | Narla |
| 2018/0159327 A1* | 6/2018 | Fidigatti ................. H02J 3/381 |

\* cited by examiner

| Instantaneous PV Power at Grid Outage | Current Time of the Day at Grid Outage | Estimated Reconnect Time | Estimated PV Power at Reconnect (Check) | Notes (All Powers are Shown in AC Ratings) |
|---|---|---|---|---|
| ~7kW-ac | Eg:8am | Eg: +9hrs (5pm) | TBD | Likely a Large 15kW PV Sysytem |
| | Eg:9am | Eg: +7.5hrs (4:30pm) | TBD | Likely a 13kW PV System |
| | Eg:10am | Eg: +6hrs (4pm) | TBD | Likely a 11kW PV System |
| | Eg:11am | Eg: +4.5hrs (3:30pm) | TBD | Likely a 10kW PV System |
| | Eg:12am | Eg: +3hrs (3pm) | TBD | Likely a 9kW PV System |
| | Eg:1pm | Eg: +2hrs (3pm) | TBD | Likely a 8kW PV System |
| | Eg:2pm | Eg: 1hrs (3pm) | | Likely a 7kW PV System |
| ~9kW-ac | Eg:8am | Eg: +9hrs (5pm) | TBD | Likely a Large 15kW PV Sysytem |
| | Eg:9am | Eg: +7.5hrs (4:30pm) | TBD | Likely a 13kW PV System |
| | Eg:10am | Eg: +6hrs (4pm) | TBD | Likely a 11kW PV System |
| | Eg:11am | Eg: +4.5hrs (3:30pm) | TBD | Likely a 10kW PV System |
| | Eg:12am | Eg: +3hrs (3pm) | TBD | Likely a 9kW PV System |
| ~12kW-ac | Eg:8am | Eg: +9hrs (5pm) | TBD | Likely a Large 15kW PV Sysytem |
| | Eg:9am | Eg: +7.5hrs (4:30pm) | TBD | Likely a 13kW PV System |
| | Eg:10am | Eg: +6hrs (4pm) | TBD | Likely a 11kW PV System |
| ~15kW-ac | Eg:8am | Eg: +9hrs (5pm) | TBD | Likely a Large 15kW PV Sysytem |

FIG. 12

PHOTOVOLTAIC DISCONNECT DEVICE FOR STORAGE INTEGRATION

CROSS-REFERENCE TO RELATED APPLICATIONS AND INCORPORATION BY REFERENCE

This application is a continuation application of U.S. application Ser. No. 17/324,715, filed May 19, 2021, which claims priority to U.S. Provisional Patent Application No. 63/027,563, filed on May 20, 2020 and U.S. Provisional Patent Application No. 63/144,204, filed Feb. 1, 2021, which are all incorporated by reference herein in their entirety for all purposes.

FIELD

The present disclosure relates to photovoltaic disconnect devices. In particular, embodiments relate to photovoltaic disconnect devices integrated with a storage electrical system providing power backup for a home or building.

BACKGROUND

Existing photovoltaic (PV) systems integrated with residential homes typically include one or more inverters (e.g., a micro-inverter, a string inverter) to convert the direct current (DC) power generated by the solar panels into alternating current (AC) power that is synchronized with the utility grid (on-grid). Accordingly, a residential PV system may generate and distribute electrical power back to the utility grid. To maintain safety, grid interconnection standards require PV system inverters to detect if there is a grid outage and shutdown operation of the inverter within a specified time period. This is known as anti-islanding (AI) detection and protection.

Grid presence is detected and monitored in the solar inverter by monitoring the AC voltage coming into the inverter from the AC grid. In addition to anti-islanding functionality, for solar inverters to operate and produce power, the grid must be within voltage and frequency ranges required by regulatory standards, and these standards are typically applied for each phase of a multi-phase AC connection, such as a split-phase 120/240V connection common in North American homes. There are some exceptions that allow solar inverters to operate on a split-phase AC connection by monitoring only line-to-line (L1-L2) voltages without monitoring the line-to-neutral (L-N) voltages. There may be additional regulatory interconnection requirements for solar inverters that do not have L-N monitoring. These requirements could include faster tripping or require additional devices for external disconnection of the solar inverter in these abnormal situations.

When some solar inverter types are used with a storage backup system in backup operation mode (microgrid), there may be interference of the AI detection of the solar inverter with operation of the storage inverter. In these situations, the AI detection may be turned off in the PV inverter. This allows the PV system to charge the storage system and/or provide backup power to the residential loads and to avoid faulting from higher impedance of the storage micro-grid. AI detection on a PV inverter is typically part of a product certification required for grid-connected operation. In backup operation, AI is not required. However, if the solar inverter cannot detect L-N voltages, in the event that the storage inverter shuts down or becomes disconnected, the AI protection of the PV inverter may be integral to shutting down the PV system quickly because it cannot detect imbalance in the L-N voltages, which could exist without a grid reference (e.g., storage inverter or real grid).

Recent solar inverters typically have the ability to curtail the generation output of PV systems using smart inverter features such as frequency-watt or volt-watt profiles to match available storage system capability. Older (legacy) PV systems typically do not have this ability and depend other methods to curtail PV production when used in storage systems. However, some inverters typically cannot curtail PV generation output quickly using a frequency-watt scheme due to a slower control loop. Consequently, if there is a sudden building (e.g., home) load drop or the energy storage system has a slow charging rate that cannot match increases in PV power output, the PV system supplies excess power to the residential electrical system, potentially causing damage to the electrical system or momentary fault trips due to excess voltage or frequency conditions.

BRIEF SUMMARY

Accordingly, there is a need, for example, for a PV disconnect device that monitors phase L-N voltages and disconnects the PV in an imbalance situation. In addition, there is a need for a PV disconnect device having the capability to integrate with existing PV power generation systems that are used to provide backup power to residential homes or buildings. In addition, there is a need for PV disconnect device that can disconnect backup PV power supply to an energy control system with a faster response time by having faster generation and load metering.

In some embodiments, the present disclosure provides an electrical system for whole home backup and partial home backup with integrated breaker spaces and metering. In some embodiments, an electrical system includes an energy control system electrically coupled to a utility grid. In some embodiments, the electrical system includes a backup photovoltaic (PV) power generation system electrically coupled to the energy control system. In some embodiments, the backup PV power generation system is configured to generate power and distribute power to the energy control system. In some embodiments, the electrical system includes an energy storage system electrically coupled to the energy control system. In some embodiments, the energy storage system has one or more energy storage units configured to store power distributed by the backup PV power generation system. In some embodiments, the electrical system includes a PV disconnect device electrically coupled to backup PV power generation system and the energy control system. In some embodiments, the PV disconnect device is configured to electrically disconnect the backup PV power generation system from the energy control system.

In some embodiments, the energy control system includes a backup power bus electrically coupled to the backup PV power generation system and the energy storage system, and the PV disconnect device is disposed downstream of the PV power generation system and upstream of the backup power bus.

In some embodiments, the energy control system includes a housing and a microgrid interconnection device (MID) disposed in the housing. In some embodiments, the microgrid interconnection device is configured to disconnect the utility grid from the PV power generation system and the energy storage system. In some embodiments, the PV disconnect device is disposed in the housing of the energy control system and in communication with a controller of the microgrid interconnection device. In some embodiments, the backup PV power generation system comprises a feed circuit configured to distribute power to the energy control system and a subpanel electrically coupled to the feed circuit. In some embodiments, the PV disconnect device is connected to the subpanel.

In some embodiments, the PV disconnect device includes an electromechanical relay electrically coupled to the backup PV power generation system. In some embodiments, the PV disconnect device includes a solid-state relay or a controllable alternating current breaker electrically coupled to the backup PV power generation system.

In some embodiments, the PV disconnect device includes sensor circuit configured to measure at least one of voltage and current of the power distributed by the backup PV power generation system. In some embodiments, the PV disconnect device includes a controller configured to process at least one of the AC voltage, frequency, and current measurements from the sensor circuit and selectively actuate electrical disconnection between the backup PV power generation system and the energy control system based on the processed voltage and current measurements.

The present disclosure provides a photovoltaic (PV) disconnect device for detecting and reacting to backup power faults and allowing energy control systems to be compatible with legacy PV power generation systems. In some embodiments, a PV disconnect device includes a relay component electrically coupled to a feed circuit of a backup PV power generation system. In some embodiments, the PV disconnect device includes sensor circuit configured to measure at least one of AC voltage, frequency, and current across the feed circuit of the PV power generation system. In some embodiments, the PV disconnect device includes a connector port electrically coupled to an energy control system. In some embodiments, the connector port is configured to communicate with the energy control system via a modbus, controller area network, (CAN), and/or direct control from energy control system.

In some embodiments, the PV disconnect device includes a (e.g., local) controller operatively connected to the relay component, the sensor circuit, and/or the connector port. In some embodiments, the controller is configured to receive voltage measurements from the sensor circuit and actuate the relay component. In some embodiments, the controller is configured to process the voltage measurements and selectively actuate the relay component based on the processed voltage measurements.

In some embodiments, the relay component includes a first relay electrically coupled to a first line/phase of a feed circuit and a second relay electrically coupled to a second line/phase of the feed circuit. In some embodiments, the relay component includes a relay driver configured to energize the first relay and the second relay such that the first and second relays electrically disconnect the first and second lines/phases of the feed circuit from the energy control system.

In some embodiments, the sensor circuit is configured to measure a first phase line-to-neutral voltage of the feed circuit and a second phase line-to-neutral voltage of the feed circuit.

In some embodiments, the processing of at least one of voltage, frequency, and current measurements includes comparing the voltage measurements to a first predetermined threshold. In some embodiments, the first predetermined threshold is based on an electrical code. In some embodiments, the processing of voltage, frequency, and/or current measurements includes determining the power output of the backup PV power generation system. In some embodiments, the processing of voltage, frequency, and current measurements includes comparing the power output of the backup PV power generation system to a second predetermined threshold. In some embodiments, the second predetermined threshold is based on a capacity of an energy storage system.

The present disclosure provides methods of controlling a photovoltaic (PV) disconnect device. In some embodiments, the method includes a step of measuring, by sensor circuit, at least one of AC voltage, frequency and current distributed along a feed circuit of a backup PV power generation system. In some embodiments, the method includes a step of receiving, by a controller, one or more voltage, frequency and current measurements from the sensor circuit. In some embodiments, the method includes a step of processing, by the controller, the one or more voltage, frequency and current measurements. In some embodiments, the method includes a step of actuating, by the controller, a relay component to electrically disconnect the feed circuit of the backup PV power generation system from an energy control system.

In some embodiments, the step of processing the one or more voltage, frequency, and current measurements includes comparing a voltage measurement to a first predetermined threshold. In some embodiments, the first predetermined threshold is based on an electrical code. In some embodiments, the measuring of the at least one voltage, frequency, and current along the feed circuit by the sensor circuit includes measuring a first phase line-to-neutral voltage of the feed circuit and a second phase line-to-neutral voltage of the feed circuit.

In some embodiments, the step of processing the one or more voltage and current measurements includes calculating a current (e.g., momentary) power output of the backup PV power generation system and comparing the current (e.g., momentary) power output to a second predetermined threshold. In some embodiments, the second predetermined threshold is based on at least one of a storage capacity of an energy storage system electrically coupled to the backup PV power generation system and a load capacity of back-up loads electrically coupled to the feed circuit of the backup PV power generation system.

In some embodiments, the relay component includes a first relay electrically coupled to a first line/phase of the feed circuit and a second relay electrically coupled to a second line/phase of the feed circuit. In some embodiments, the actuating by the controller includes transmitting a first drive signal to the first relay and a second drive signal to the second relay or same signal to both.

In some embodiments, an electrical system includes a backup PV power generation system configured to generate and supply power. In some embodiments, the electrical system includes an energy storage system configured to store power supplied by the backup PV power generation system. In some embodiments, the electrical system includes an energy control system. In some embodiments, the energy control system has a microgrid interconnection device electrically coupled to the backup PV power generation system, the energy storage system, at least one backup load, and a utility grid. In some embodiments, the energy control system has a controller in communication with the microgrid interconnection device and configured to monitor electronic data of the electrical system. In some embodiments, the electrical system has a PV disconnect device in communication with the controller and configured to electrically disconnect the backup PV power generation system from the microgrid interconnection device. In some embodiments, the controller is configured to detect a power deviation event based on the monitored electronic data. In some embodiments, when detecting the power deviation event, the controller actuates the PV disconnect device to disconnect the backup PV power generation system from the microgrid interconnection device.

In some embodiments, the electronic data includes a power output of the backup PV power generation system, an available storage capacity of the energy storage system, and a current load demand by the at least one backup load.

In some embodiments, the power deviation event includes when the monitored power output of the backup PV power generation system is greater than the available storage capacity of the energy storage system.

In some embodiments, the power deviation event includes when the load demand by the at least one backup load decreases below a threshold value within a set time period.

In some embodiments, electronic data includes an operating status of the utility grid electrically coupled to the microgrid interconnection device, and the power deviation event includes when the operating status indicates a power outage of the utility grid.

In some embodiments, after disconnecting the backup PV power generation system from the microgrid interconnection device, the controller is configured to keep the PV disconnect device in an open state for a predetermined time period. In some embodiments, the predetermined time period is based on an algorithm or a lookup table.

In some embodiments, an electrical system includes a backup photovoltaic (PV) power generation system having at least one PV panel array configured to generate and supply power. In some embodiments, the electrical system includes an energy control system. In some embodiments, the energy control system has a microgrid interconnection device having a backup side electrically coupled to the backup PV power generation system and at least one backup load and a non-backup side electrically coupled to a utility grid. In some embodiments, the energy control system has a controller in communication with the microgrid interconnection device and configured to monitor electronic data of the electrical system. In some embodiments, the electrical system includes a first PV disconnect device disposed downstream of at least one PV panel array of the backup PV power generation system and upstream of the backup side of the microgrid interconnection device. In some embodiments, the first PV disconnect device is in communication with the controller and configured to electrically disconnect the at least one PV panel array of the backup PV power generation system from the microgrid interconnection device.

In some embodiments, the energy control system includes a PV interconnection electrically coupled to at least one PV panel array of the backup PV power generation system. In some embodiments, the energy control system includes a backup power bus electrically coupled to the PV interconnection and the microgrid interconnection device. In some embodiments, the energy control system includes a housing covering the microgrid interconnection device, the backup bower bus, and the PV interconnection.

In some embodiments, the first PV disconnect device is electrically coupled to the backup power bus and disposed inside the housing. In some embodiments, the first PV disconnect device is electrically coupled to the backup power bus and disposed outside the housing. In some embodiments, the first PV disconnect device is electrically coupled to the PV interconnection and disposed outside the housing of the energy control system. In some embodiments, the first PV disconnect device includes a housing separated from the housing of the energy control system.

In some embodiments, the electrical system includes a second PV disconnect device disposed downstream of at least one second PV panel array of the backup PV power generation system and upstream of the backup side of the microgrid interconnection device. In some embodiments, the second PV disconnect device is configured to electrically disconnect the at least one second PV panel array from the microgrid interconnection device.

In some embodiments, the first PV disconnect device is electrically coupled to the backup power bus and disposed inside the housing, and the second PV disconnect device is electrically coupled to the backup power bus and disposed outside the housing.

In some embodiments, the electrical system includes a non-backup PV power generation system having at least one PV panel array configured to generate and supply power to the non-backup side of the microgrid interconnection device. In some embodiments, the electrical system further includes a second PV disconnect device disposed downstream of at least one PV panel array of the non-backup PV power generation system and upstream of the non-backup side of the microgrid interconnection device.

In some embodiments, the present disclosure provides a method for controlling an electrical system having a backup PV power generation system, an energy storage system, and an energy control system, the energy control system electrically coupled to the PV power generation system, the energy storage system, a plurality of loads, and a utility grid. In some embodiments, the method includes a step of monitoring electronic data from the electrical system. In some embodiments, the method includes a step of determining whether the monitored electronic data indicates a power deviation event. In some embodiments, the method includes a step of opening a PV disconnect device to electrically disconnect the backup PV power generation system from a microgrid interconnection device of the energy control system.

In some embodiments, the step of determining whether the monitored electronic data indicates a power deviation event further includes detecting when an operating status of the utility grid indicates a power outage. In some embodiments, the step of determining whether the monitored electronic data indicates a power deviation event further includes comparing a frequency of the power supplied by the backup PV power generation system to a setpoint frequency.

In some embodiments, the present disclosure provides a method for controlling an electrical system having a backup PV power generation system, an energy storage system, and an energy control system, the energy control system electrically coupled to the PV power generation system, the energy storage system, a plurality of loads, and a utility grid. In some embodiments, the method includes a step of receiving electronic data indicating a power output of backup PV power generation system. In some embodiments, the method includes a step of determining whether the power output of backup PV power generation system exceeds a PV output threshold. In some embodiments, the method includes a step of operating a PV disconnect device in a feedforward control mode when power output is above the PV output threshold and in a dynamic control mode when power output is below the PV output threshold. In some embodiments, operating the PV disconnect device in the feedforward control mode includes using a lookup table stored in a memory of a controller. In some embodiments, operating the PV disconnect device in the dynamic control mode includes using an algorithm stored in the memory of a controller.

In some embodiments, the algorithm includes using electronic data related to backup PV power generation system, the energy storage system, the plurality of loads, and/or the utility grid. In some embodiments, the lookup table includes field (e.g., column or row) listing values corresponding to PV power output of backup PV power generation system. In some embodiments, the lookup table includes a field listing values corresponding to the time of day. In some embodiments, the lookup table includes a field listing values corresponding to a predetermined time period for keeping PV disconnect device in a closed state or open state.

In some embodiments, the present disclosure provides an electrical system. In some embodiments, the electrical system includes an energy control system electrically coupled to a utility grid. In some embodiments, the electrical system includes a backup photovoltaic (PV) power generation system electrically coupled to the energy control system. In some embodiments, the backup PV power generation system is configured to generate and supply power. In some embodiments, the electrical system includes an energy storage system electrically coupled to the energy control system. In some embodiments, the energy storage system has one or more energy storage units configured to store power supplied by the backup PV power generation system. In some embodiments, the electrical system includes a PV disconnect device electrically coupled to backup PV power generation system and the energy control system. In some embodiments, the PV disconnect device is configured to electrically disconnect the backup PV power generation system from the energy control system.

In some embodiments, the energy control system includes a backup power bus electrically coupled to the backup PV power generation system and the energy storage system, and the PV disconnect device is disposed downstream of the PV power generation system and upstream of the backup power bus.

In some embodiments, the energy control system includes a housing and a microgrid interconnection device disposed in the housing. In some embodiments, the microgrid interconnection device is configured to disconnect the utility grid from the PV power generation system and the energy storage system. In some embodiments, the PV disconnect device is disposed in the housing of the energy control system and in communication with a controller of the microgrid interconnection device.

In some embodiments, the energy control system has a microgrid interconnection device electrically coupled to the backup PV power generation system, the energy storage system, at least one backup load, and a utility grid. In some embodiments, the energy control system has a controller in communication with the microgrid interconnection device and the PV disconnect device. In some embodiments, the controller is configured to monitor electronic data of the electrical system. In some embodiments, the controller is configured to detect a power deviation event based on the monitored electronic data. In some embodiments, when detecting the power deviation event, the controller actuates the PV disconnect device to disconnect the backup PV power generation system from the microgrid interconnection device.

In some embodiments, the electronic data includes a power output of the backup PV power generation system, an available storage capacity of the energy storage system, and/or a current load demand by the at least one backup load. In some embodiments, the power deviation event includes when the monitored power output of the backup PV power generation system is greater than the available storage capacity of the energy storage system. In some embodiments, the power deviation event includes when the load demand by the at least one backup load decreases below a threshold value within a set time period. In some embodiments, the electronic data includes an operating status of the utility grid electrically coupled to the microgrid interconnection device, and the power deviation event includes when the operating status indicates a power outage of the utility grid. In some embodiments, the electronic data includes a frequency of the power supplied by the backup PV power generation system, and the power deviation event includes when the monitored frequency of the power supplied by the backup PV power generation system rises above a setpoint frequency more than a predetermined number of times within a predetermined time period. In some embodiments, after disconnecting the backup PV power generation system from the microgrid interconnection device, the controller is configured to keep the PV disconnect device in an open state for a predetermined time period. In some embodiments, the predetermined time period is based on an algorithm or a lookup table. In some embodiments, the PV disconnect device includes at least one of an electromechanical relay, a solid-state relay, and a controllable alternating current breaker electrically coupled to the backup PV power generation system.

The present disclosure provides a photovoltaic (PV) disconnect device for detecting and reacting to backup power faults and allowing energy control systems to be compatible with legacy PV power generation systems. In some embodiments, a PV disconnect device includes a relay component electrically coupled to a feed circuit of a backup PV power generation system. In some embodiments, the PV disconnect device includes sensor circuit configured to measure at least one of AC voltage, frequency, and current across the feed circuit of the backup PV power generation system. In some embodiments, the PV disconnect device includes a connector port electrically coupled to an energy control system. In some embodiments, the PV disconnect device includes a controller operatively coupled to the relay component, the sensor circuit, and the connector port. In some embodiments, the controller is configured to receive voltage, current, and/or frequency measurements from the sensor circuit and actuate the relay component. In some embodiments, the controller is configured to process the voltage, current, and frequency measurements and selectively actuate the relay component based on the processed voltage, current, and frequency measurements.

In some embodiments, the relay component includes a first relay electrically coupled to a first line of a feed circuit. In some embodiments, the relay component includes a second relay electrically coupled to a second line of the feed circuit. In some embodiments, the relay component includes a relay driver configured to energize the first relay and the second relay such that the first and second relays electrically disconnect the first and second lines of the feed circuit from the energy control system.

In some embodiments, the sensor circuit is configured to measure a first phase line-to-neutral voltage of the feed circuit and a second phase line-to-neutral voltage of the feed circuit. In some embodiments, the processing of voltage measurements includes comparing the voltage measurements to a first predetermined threshold, and wherein the first predetermined threshold is based on an electrical code.

BRIEF DESCRIPTION OF THE FIGURES

The accompanying drawings, which are incorporated herein and form part of the specification, illustrate embodi

FIG. 12 illustrates a lookup table for a feedforward control mode of a PV disconnect device according to an embodiment.

Figure 1:
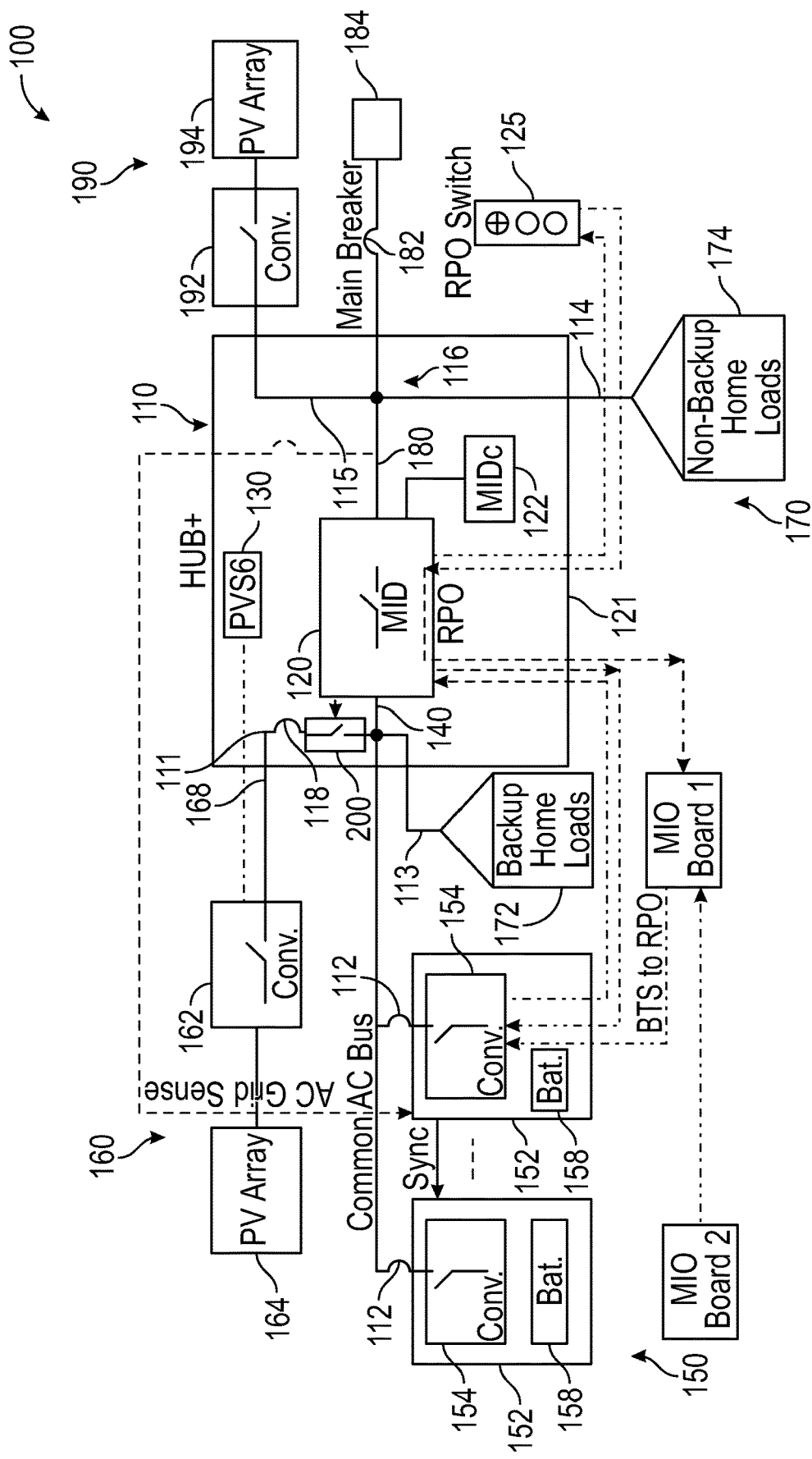
- FIG. 1 illustrates an electrical system according to an embodiment.

The features and advantages of the embodiments will become more apparent from the detail description set forth below when taken in conjunction with the drawings. A person of ordinary skill in the art will recognize that the drawings may use different reference numbers for identical, functionally similar, and/or structurally similar elements, and that different reference numbers do not necessarily indicate distinct embodiments or elements. Likewise, a person of ordinary skill in the art will recognize that functionalities described with respect to one element are equally applicable to functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," "certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "about" or "substantially" or "approximately" as used herein refer to a considerable degree or extent. When used in conjunction with, for example, an event, circumstance, characteristic, or property, the term "about" or "substantially" or "approximately" can indicate a value of a given quantity that varies within, for example, 1-15% of the value (e.g., ±1%, ±2%, ±5%, ±10%, or ±15% of the value), such as accounting for typical tolerance levels or variability of the embodiments described herein.

The terms "microgrid," "backup mode," and "off-grid" as used herein refer to a group of interconnected loads (e.g., plurality of backup loads) and power distribution resources (e.g., backup PV power generation system, energy storage system, and energy control system) that function as a single controllable power network independent to the utility grid.

The terms "upstream" and "downstream" as used herein refer to the location of a component of the electrical system with respect to the direction of current or power flow being supplied to the energy control system.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

When PV inverters are used with a storage backup system, there may be interference of AI detection by the solar inverter during backup mode. In these situations, the AI detection may be disabled in the PV inverter so that PV power generation system may charge the storage system and/or provide power to the backup loads without interference. Consequently, conventional PV systems may struggle to detect L-N voltage imbalances, thereby posing the risk of spiking residential loads with a voltage surge. While some PV system inverters have AI mechanisms that are compatible with micro-grid backup operation, these inverters usually lack the capability to curtail the generation output of the PV system to match available storage capability Thus, there is a need for a disconnect device that can detect and rectify PV fault occurrences with a faster response time, while having the capability to integrate with existing PV power generation systems that are used to provide backup power to residential homes or buildings.

More recent PV inverters typically have controlled power generation of PV systems using a frequency-watt control scheme, in which the PV inverter curtails power output of the PV system when the measured frequency rises above a nominal frequency. Since PV inverters cannot curtail large amounts of PV power output within a short time period, frequency-watt control usually only functions well when the power rating of the PV system is about equal to or slightly over (e.g., within 10% to 20%) the storage capacity of the energy storage system. Accordingly, if electrical systems rely on frequency-watt control to curtail PV power output, the available PV power output typically needs to be limited to the storage capacity of the energy storage system to protect the electrical system (e.g., a residential electrical system) from receiving excess power output.

According to embodiments described herein, the PV disconnect device of the present disclosure may overcome one or more of these deficiencies, for example, by having a relay component electrically coupled to a feed circuit of a PV power generation system, sensor circuit configured to measure voltage and/or current on both sides of the feed circuit of the backup PV power generation system, a connector port electrically coupled to an energy control system, and a controller operatively connected to the relay component, the sensor circuit, and/or the connector port.

Additionally, according to embodiments described herein, the PV disconnect device of the present disclosure may overcome one or more of these deficiencies, for example, by being in communication with the controller of the energy control system, in which the controller monitors electronic data of the electrical system and actuates the PV disconnect device to open or close based on the monitored electronic data. Syncing operation of the PV disconnect device with the controller of the energy control system expedites the generation (e.g., PV power output) and load metering of the PV disconnect device and minimizes potential possibilities of excess PV power output being supplied to the loads, thereby allowing the electrical system to have a higher PV power output while ensuring safe, smooth, and reliable operation of the electrical system.

FIG. 1 shows an electrical system 100 according to some embodiments. In some embodiments, electrical system 100 can include an energy control system 110 (e.g., "HUB+"). In some embodiments, electrical system 100 can include an energy storage system 150 electrically coupled to energy control system 110. In some embodiments, electrical system 100 can include a backup photovoltaic (PV) power generation system 160 electrically coupled to energy control system 110. In some embodiments, electrical system 100 can include a non-backup PV power generation system 190 electrically coupled to energy control system 110. Electrical system 100 can include any component or be operated in any way, as disclosed in U.S. application Ser. No. 16/811,832, filed Mar. 6, 2020, titled "ENERGY CONTROL SYSTEM," the entirety of which is incorporated herein by reference.

In some embodiments, electrical system 100 can include a plurality of electrical loads 170 electrically coupled to energy control system 110. In the context of the present disclosure, an electrical load can be, for example, one or more devices or systems that consume electricity. In some embodiments, the plurality of electrical loads 170 can include all or some of the electrical devices associated with a building. In some embodiments, the plurality of electrical loads 170 can include 240-volt loads. In some embodiments, the plurality of electrical loads 170 can include, for example, an electric range/oven, an air conditioner, a heater, a hot water system, a swimming pool pump, and/or a well pump. In some embodiments, the plurality of electrical loads 170 can include 120-volt loads. In some embodiments, the plurality of electrical loads 170 can include, for example, power outlets, lighting, networking and automation systems, a refrigerator, a garbage disposal unit, a dishwasher, a washing machine, a septic pump, and/or an irrigation system. In some embodiments, the plurality of electrical loads 170 can be separated into a plurality of backup loads 172 and a plurality of non-backup loads 174. In some embodiments, the plurality of backup loads 172 include one or more essential loads that continue to receive power from the backup PV power generation system 160 and/or energy storage system 150 during a utility power outage, and the plurality of non-backup loads 174 include one or more non-essential loads that do not receive power from the backup PV power generation system 160 and/or energy storage system 150 during a utility power outage.

In some embodiments, backup PV power generation system 160 can include one or more power generation arrays 164 (e.g., a photovoltaic panel array), and each power generation array 164 can include one or more power generation units (e.g., a photovoltaic panel) configured to generate power. In some embodiments, backup PV power generation system 160 can include one or more PV converters 162 (e.g., a micro-inverter). In some embodiments, PV converter 162 can include any type of components (e.g., an inverter) such that PV converter 162 is configured to convert direct current ("DC") to alternating current ("AC") or vice versa. In some embodiments, at least one PV converter 162 synchronizes the phase of the power feed to split-phase AC that is compatible with the utility grid. In some embodiments, PV converter 162 can be a part of power generation unit. In some embodiments, one, two, three, four, or more power generation units can be interconnected to a single PV converter 162 (e.g., a string inverter). In some embodiments, backup PV power generation system 160 includes one or more power optimizers such as, for example, DC power optimizers. In some embodiments, backup PV power generation system 160 can include a feed circuit 168 (e.g., split-phase three wire) configured to distribute power to the energy control system 110.

In some embodiments, non-backup PV power generation system 190 can include one or more power generation arrays 194 (e.g., a photovoltaic panel array), and each power generation array 194 can include one or more power generation units (e.g., a photovoltaic panel). In some embodiments, non-backup PV power generation system 190 can include one or more PV converters 192. In some embodiments, PV converter 192 can include the features of any one of the converters described herein.

In some embodiments, energy storage system 150 can include one or more storage units 152. In some embodiments, storage unit 152 can include one or more batteries 158. In some embodiments, storage unit 152 can include a storage converter 154 configured to adjust a charging rate and/or a discharging rate of the one or more batteries 158.

In some embodiments, energy control system 110 can include a backup power bus 140, for example, electrically coupled to backup PV power generation system 160 via a backup PV interconnection 111, energy storage system 150 via a storage interconnection 112, and the plurality of backup loads 172 via a backup load interconnection 113.

In some embodiments, energy control system 110 can include a grid interconnection 116 electrically coupled to a utility grid 184. In some embodiments, grid interconnection 116 can include a non-backup power bus 180 and an over-current-protection device 182 (e.g., main service panel with a main circuit breaker, such as a 200 A circuit breaker) electrically coupled to utility grid 184 so that grid power is distributed to energy control system 110. In some embodiments, energy control system can include a non-backup load interconnection 114 electrically coupled to one or more non-backup loads 174 and a non-backup PV interconnection 115 electrically coupled to the non-backup PV power generation system 190.

In the context of the present disclosure, an interconnection includes any suitable electrical structure, such as a power bus, wiring, a panel, etc., configured to establish electrical communication between two sets of circuits. Any one of interconnections 111-116 can include an AC bus, a panel, a sub-panel, a circuit breaker, any type of conductor, or a combination thereof.

In some embodiments, energy control system 110 can include a microgrid interconnection device 120 (e.g., an automatic transfer or disconnect switch) electrically coupled to backup power bus 140 and non-backup power bus 180, such that microgrid interconnection device 120 is electrically coupled to backup PV interconnection 111, storage interconnection 112, backup load interconnection 113, non-backup load interconnection 114, non-backup PV interconnection 115, and/or grid interconnection 116. In the context of the present disclosure, a microgrid interconnection device can be, for example, any device or system that is configured to automatically connect circuits, disconnect circuits, and/or switch one or more loads between power sources. In some embodiments, a microgrid interconnection device 120 can include any combination of switches, relays, and/or circuits to selectively connect and disconnect respective interconnections 111-116 electrically coupled to energy control system 110. In some embodiments, such switches can be automatic disconnect switches that are configured to automatically connect circuits and/or disconnect circuits. In some embodiments, such switches can be transfer switches that are configured to automatically switch one or more loads between power sources.

In some embodiments, microgrid interconnection device 120 can be configured to operate in an on-grid mode (e.g., closed), in which microgrid interconnection device 120 electrically connects the backup power bus 140 to the non-backup power bus 180. In some embodiments, when operating under the on-grid mode, microgrid interconnection device 120 can be configured to distribute electrical energy received from utility grid 184 and non-backup PV power generation system 190 to backup loads 172. In some embodiments, when operating under the on-grid mode, microgrid interconnection device 120 can be configured to distribute electrical energy received from energy storage system 150 and/or backup PV power generation system 160 to non-backup loads 174.

In some embodiments, microgrid interconnection device 120 can be configured to operate in a backup mode (e.g., opened), in which microgrid interconnection device 120 electrically disconnects non-backup power bus 180 from backup power bus 140. In some embodiments, when operating under the backup mode, microgrid interconnection device 120 can disrupt electrical energy received from non-backup PV power generation system 190 from reaching backup loads 172. In some embodiments, when operating under the backup mode, microgrid interconnection device 120 can disrupt electrical communication between backup loads 172 and utility grid 184. In some embodiments, when operating under the backup mode, microgrid interconnection device 120 can disrupt electrical energy received from energy storage system 150 and/or backup PV power generation system 160 from reaching non-backup loads 174.

In some embodiments, energy control system 110 can include a controller 122 in communication with microgrid interconnection device 120 and configured to control the distribution of electrical energy between energy storage system 150, backup PV power generation system 160, the plurality of electrical loads 170, utility grid 184, and/or non-backup PV power generation system 190. In some embodiments, controller 122 can be configured to detect the status (e.g., power outage or voltage restoration) of grid interconnection 116 and switch microgrid interconnection device 120 between the on-grid mode and the backup mode based on the status of grid interconnection 116. If the status of grid interconnection 116 indicates a power outage, controller 122 can be configured to switch microgrid interconnection device 120 to the backup mode. If the status of grid interconnection 116 indicates a voltage restoration, controller 122 can be configured to switch microgrid interconnection device 120 to the on-grid mode.

Figure 2:
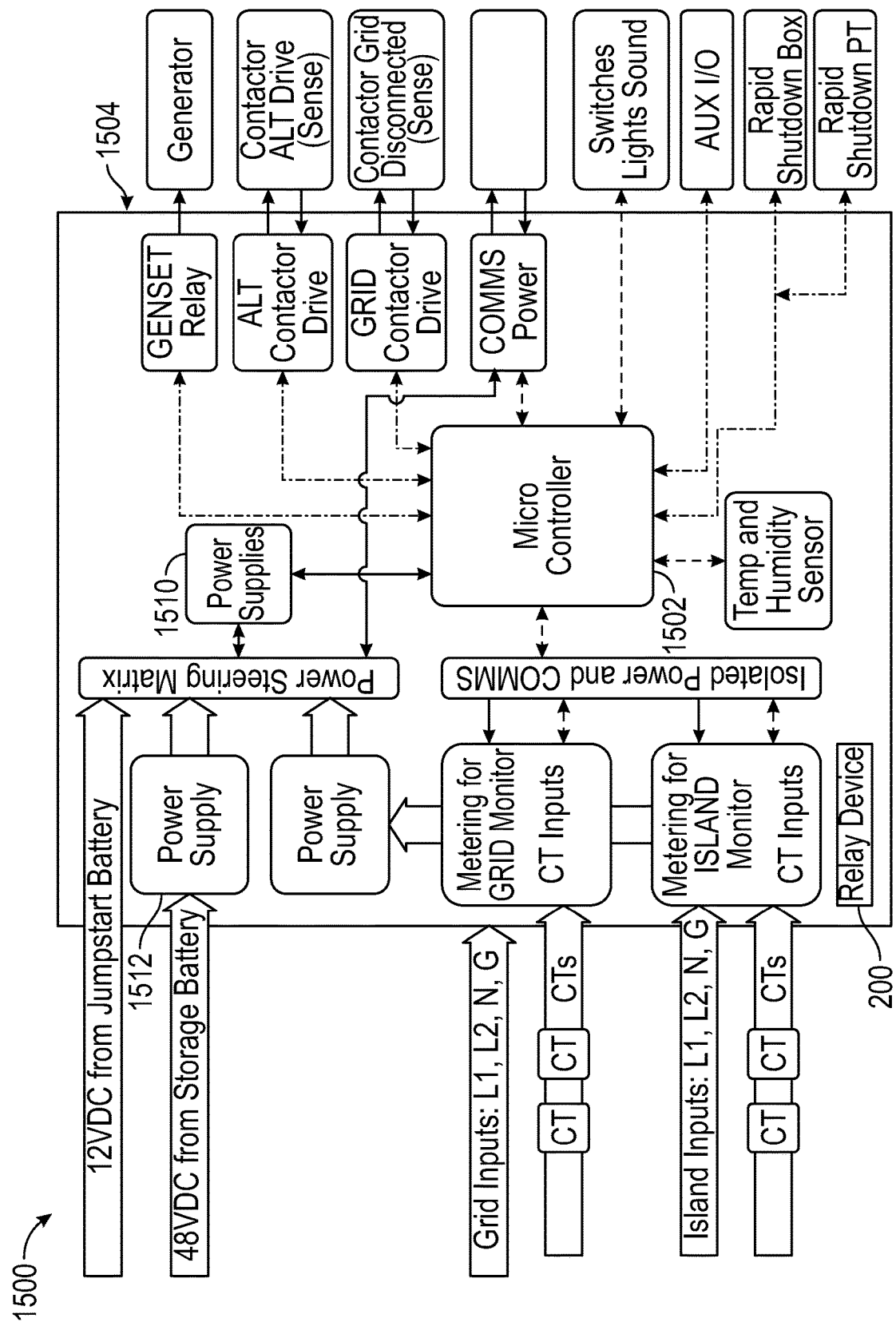
FIG. 2 illustrates a controller architecture according to an embodiment.

FIG. 2 shows a block diagram of an example controller 1500 that can be implemented as the controller 122 in energy control system 110 according to some embodiments. In some embodiments, controller 1500 can include a microcontroller 1502 having a central-processing-unit (e.g., programmable system-on-chip controller). In some embodiments, controller 1500 can handle microgrid interconnection device coils of 12 volts using an ALT contactor drive 1504. In some embodiments, controller 1500 can control relays. In some embodiments, controller 1500 can measure current and voltage (e.g. via current transformer "CT" or Potential transformer "PT"). In some embodiments, controller 1500 can measure the differences between grid power and backup power such as, for example, differences in phase, frequency, voltage, etc. In some embodiments, controller 1500 can have an internal power supply 1510 (e.g., 5 VDC & 3.3 VDC internal power supply). In some embodiments, controller 1500 can have external power inputs 1512 (e.g., 48V to 12 VDC power supply from storage battery). In some embodiments, controller 1500 can receive power from the electrical grid, an energy storage system, and/or a power generation system. In some embodiments, controller 1500 can control microgrid interconnection device coils that need to reverse coil polarity to reset. In some embodiments, controller 1500 can include an auxiliary power input to receive power from batteries. In some embodiments, controller 1500 can include connectors for communicating with and/or controlling the microgrid interconnection device. In some embodiments, controller 1500 can include a "test mode" for simulating a grid outage and/or an emergency system shutdown. In some embodiments, controller 1500 can include visual and/or audible alarms, for example, to indicate system status. In some embodiments, controller 1500 can allow a rapid system shutdown (including remote shutdown) and/or a direct pass-through to system inverters for safety. In some embodiments, controller 1500 can include generator start relays for continuous backup and/or battery jump-start relays for "dark-start" situations.

In some embodiments, as shown in FIG. 1, for example, energy control system 110 can include a PV monitoring system 130 (e.g., PVS6) in communication with backup PV power generation system 160 and/or non-backup PV power generation system 190 such that PV monitoring system 130 receives electronic data related to backup PV power generation system 160 and/or non-backup PV power generation system 190. In some embodiments, PV converter 162 can be configured to send electronic data to and/or receive electronic data from PV monitoring system 130. In some embodiments, PV converter 162 can be configured to receive electronic data from PV monitoring system 130, and can be configured to change state (e.g., exporting power or not exporting power, increasing or decreasing amount of power exporting) based on the electronic data received. In some embodiments, PV converter 162 can also be configured to send electronic data to PV monitoring system 130. For example, in some embodiments, PV converter 162 can be configured to send to PV monitoring system 130 electronic data relating to the state of backup PV power generation system 160 (e.g., the amount of power being exported).

In some embodiments, controller 122 can be linked to PV monitoring system 130 to receive the electronic data related to backup PV power generation system 160 and/or non-backup PV power generation system 190. In some embodiments, controller 122 can control distribution of energy based on the electronic data related to PV power generation system 160 and/or non-backup PV power generation system 190.

In some embodiments, energy control system 110 can include a housing 121 enclosing controller 122, microgrid interconnection device 120, and/or PV monitoring system 130. In some embodiments, housing 121 can at least partially enclose backup power bus 140, non-backup power bus 180, and any one of interconnections 111-116. In some embodiments, PV monitoring system 130 can be physically separated from housing 121, for example, linked wirelessly to controller 122 over a local-area-network (e.g., residential Wi-Fi network). For example, in some embodiments, backup PV power generation system 160 and PV monitoring system 130 can be disposed on an auxiliary building (e.g., a garage) that is separate from the main residential building (e.g., a house).

In some embodiments, energy control system 110 can include a rapid shutdown switch 125 that is configured to rapidly de-energize portions of electrical system 100 (e.g., portions of energy storage system 150, backup PV power generation system 160, and/or non-backup PV power generation system 190). For example, during an emergency (e.g., a fire), persons such as first responders (e.g., firefighters) can use rapid shutdown switch 125 to quickly de-energize portions of energy storage system 150, backup PV power generation system 160, and/or non-backup PV power generation system 190.

In some embodiments, energy control system 110 can include a PV disconnect device 200 (e.g., a PV relay device) electrically coupled to the feed circuit 168 of backup PV power generation system 160. In some embodiments, PV disconnect device 200 can be disposed along backup PV interconnection 111. In some embodiments, PV disconnect device 200 can be disposed upstream of backup power bus 140 and downstream of AC breakers 118 for backup PV power generation system 160. In some embodiments, PV disconnect device 200 can be disposed inside housing 121 of energy control system 110. In some embodiments, PV disconnect device 200 can be disposed outside of housing 121 (e.g., disposed at a downstream subpanel of backup PV power generation system 160). In some embodiments, energy control system 110 can include multiple PV disconnect devices 200 disposed at different locations in electrical system 100 such that each PV disconnect device 200 can electrically decouple one or more PV power generation arrays 164, 194 from energy control system 110. In some embodiments, a controller (e.g., controller 122 and/or PV monitoring system 130) of energy control system 110 can control each PV disconnect device 200 independently to partially reduce PV power output and/or control all PV disconnect devices 200 collectively at the same time to completely reduce PV power output.

In some embodiments, PV disconnect device 200 can be configured to monitor the power distributed by the feed circuit 168 of backup PV power generation system 160. In some embodiments, PV disconnect device 200 can monitor power distributed by a split-phase feed circuit (e.g., 120V/240V) of backup PV power generation system 160 through measuring: (i) phase one line-to-neutral voltage (e.g., L1-N), (ii) phase two line-to-neutral voltage, (e.g., L2-N) and/or (iii) line-to-line voltage (e.g., L1-L2) of the feed circuit 168 from backup PV power generation system 160. In some embodiments, PV disconnect device 200 can monitor voltage on both ends of PV disconnect device 200 for any relay weld detection. In some embodiments, the voltage measurements on both sides of each PV disconnect device 200 is monitored to determine if there is a relay abnormal state with respect to the expected state (e.g., weld or stuck open scenarios).

In some embodiments, PV disconnect device 200 can include any type of circuitry component (e.g., a voltmeter, a potential transformer, and/or a current transformer), to measure voltage and/or current across the feed circuit 168 of backup PV power generation system 160. In some embodiments, PV disconnect device 200 can be in communication with another controller, such as, for example, controller 122 or PV monitoring system 130 of energy control system 110, to collect voltage measurements and/or power output of feed circuit from backup PV power generation system 160.

In some embodiments, PV disconnect device 200 can be configured to monitor the frequency of the AC distributed by the feed circuit 168 of backup PV power generation system 160. In some embodiments, PV disconnect device 200 can include any type of circuitry component (e.g., frequency meter, frequency counter, and/or oscilloscope) to measure the frequency of the AC distributed by the feed circuit 168 of the backup PV power generation system 160. In some embodiments, PV disconnect device 200 can be in communication with another controller, such as, for example, controller 122 or PV monitoring system 130 of energy control system 110, to collect frequency measurements of feed circuit 168 from backup PV power generation system 160.

In some embodiments, PV disconnect device 200 can be configured to receive auxiliary power (e.g., for controller) from an input side and/or an output side. For example, in some embodiments, PV disconnect device 200 can be configured to receive power from feed circuit 168 of the backup PV power generation system 160 and backup power bus 140 of energy control system 110. In some embodiments, PV disconnect device 200 can be configured to monitor the direction of the current flowing from the input side to the output side of PV disconnect device 200. In some embodiments, PV disconnect device 200 can be configured to determine whether the input side is properly connected to feed circuit 168 of the backup PV power generation system 160 based on the detected direction of current. For example, if PV disconnect device 200 determines that the direction of current is being flown from backup power bus 140 to feed circuit 168, PV disconnect device 200 can indicate an improper wiring warning to a user.

In some embodiments, PV disconnect device 200 can be configured to process the voltage and/or current measurements of the feed circuit 168 from the backup PV power generation system 160 (e.g., power output data of the backup PV power generation system 160). In some embodiments, the PV disconnect device 200 can process the voltage and/or measurements based on algorithm(s) that compares the line-to-neutral voltages (e.g., L1-N voltage, L2-N voltage, root mean square of L1-N and L2-N voltages) to a first threshold. In some embodiments, the PV disconnect device 200 can process the voltage and/or measurements based on algorithm(s) that compares the line-to-line voltages (e.g., L1-L2 voltage) to a second threshold. In some embodiments, the first threshold and/or second threshold can be set to comply with state or national codes and product standards (e.g., UL 1741, NEC 2020). For example, in some embodiments, the first threshold with respect to the line-to-neutral voltages can be set at 120V, and the second threshold with respect to the line-to-line voltage can be set at 240V. In some embodiments, the first threshold with the respect to the line-to-neutral voltages can be set at 120% of or less (e.g., 120%, 115%, 110%, and/or 105%) than the rating at the power bus of the service panel (e.g., 120% of the rating at backup power bus 140 of energy control system 110).

In some embodiments, PV disconnect device 200 can process the voltage and/or current measurements across the feed circuit 168 of backup PV power generation system 160 to determine the power output (e.g., a dynamic or instantaneous power output) of backup PV power generation system 160. In some embodiments, PV disconnect device 200 can process the voltage measurements based on algorithm(s) that compares the power output of backup PV power generation system 160 to an available storage capacity of energy storage system 150 and/or a load capacity of the plurality of electrical loads 170 (e.g., the load capacity with respect to one or more of backup loads 172 and/or non-backup loads 174). In some embodiments, the available storage capacity corresponds to a difference between a total storage capacity and a current state of charge (SoC) of energy storage system 150. In some embodiments, PV disconnect device 200 can process the voltage measurements based on algorithm(s) that compares the backup PV power output to a power threshold. In some embodiments, the power threshold is determined by the storage capacity of energy storage system 150 (e.g., 7.5 kW AC).

In some embodiments, PV disconnect device 200 can be configured to process the frequency measurements of the feed circuit 168 from the backup PV power generation system 160. In some embodiments, PV disconnect device can process the frequency measurements of the feed circuit 168 based on algorithm(s) that compares measured frequency to a setpoint frequency (e.g., 60 Hz and/or 50 Hz) to determine if there is an under-frequency event (e.g., when measured frequency drops below the setpoint frequency) or an over-frequency event (e.g., when measured frequency rises above the setpoint frequency). In some embodiments, PV disconnect device 200 can process the frequency measurements across the feed circuit 168 of backup PV power generation system 160 to determine the power output (e.g., a dynamic or instantaneous power output) of backup PV power generation system 160.

In some embodiments, PV disconnect device 200 can include a controller (e.g., a microcontroller) to process voltage, current, and/or frequency measurements. In some embodiments, PV disconnect device 200 can be in communication with another controller, such as, for example, controller 122 or PV monitoring system 130 of energy control system 110, to process voltage measurements.

In some embodiments, PV disconnect device 200 can be configured to disrupt the electrical connection between the feed circuit 168 of backup PV power generation system 160 and the backup power bus 140 of energy control system 110. In some embodiments, PV disconnect device 200 can include an electromechanical relay (e.g., a switch device having a coil, an armature, and contactors) electrically coupled to feed circuit 168 of PV disconnect device 200 and configured to disrupt the electrical connection between the feed circuit 168 of backup PV power generation system 160 and the backup power bus 140 of energy control system 110. In some embodiments, PV disconnect device can include a solid-state relay (e.g., semiconductor device having a transistor or integrated-circuit) or controllable AC breaker coupled to feed circuit 168 of PV disconnect device 200 and configured to disrupt the electrical connection between the feed circuit 168 of backup PV power generation system 160 and the backup power bus 140 of energy control system 110.

In some embodiments, controller 122 and/or PV monitoring system 130 of energy control system 110 can monitor electronic data of the electrical system and actuate PV disconnect device 200 to open and/or close based on monitored electronic data. In some embodiments, controller 122 or PV monitoring system 130 can process the electronic data within a set time period (e.g., about 5 milliseconds to about 10 milliseconds) and actuate the PV disconnect device 200 to open and/or close within a set response period (e.g., 10 milliseconds to 40 milliseconds). By communicating with controller 122, PV disconnect device 200 can assume faster generation (e.g., PV power output) and load metering and disconnect backup PV power generation system 160 within a faster response time.

In some embodiments, electronic data can be related to, for example, backup PV power generation system 160, energy storage system 150, utility grid 184, the plurality of backup loads 172, and/or non-backup loads 174. In some embodiments, some embodiments, electronic data related to backup PV power generation system 160 can include a detected power output of backup PV power generation system 160. In some embodiments, electronic data related to backup PV power generation system 160 can include a frequency of the power supplied by backup PV power generation system 160. In some embodiments, electronic data related to energy storage system 150 can include an available storage capacity. In some embodiments, electronic data related to the plurality of backup loads 172 can include a current (e.g., momentary) backup load demand. In some embodiments, electronic data related to the plurality of non-backup loads 174 can include a current (e.g., momentary) non-backup load demand. In some embodiments, electronic data related to utility grid 184 can include an operating status of utility grid 184 electrically coupled to microgrid interconnection device 120 (e.g., grid-tied or power outage).

In some embodiments, PV disconnect device 200 can be configured to disconnect backup PV power generation system 160 from energy control system 110 when detecting that the measured current exceeds a predetermined threshold current rating. In some embodiments, the predetermined threshold current rating can range, for example, from about 80 A to about 90 A or above. In some embodiments, PV disconnect device 200 can be configured to remain open for a set time period (e.g., about 1 to about 5 hours) after detecting that the measured current exceeds a predetermined threshold current rating.

In some embodiments, PV disconnect device 200 can convert AC inputted from the feed circuit 168 of the backup PV power generation system 160 to low voltage DC that is used to auxiliary power components of PV disconnect device 200, such as a controller. In some embodiments, PV disconnect device 200 can reduce the voltage of the AC inputted from the feed circuit 168 of the backup PV power generation system 160 to a minimal operating voltage. For example, in some embodiments, PV disconnect device 200 can reduce an input AC at 240V to a DC at 12V/6V for bias power supply purposes. In some embodiments, PV disconnect device 200 can include any type of circuitry component to convert and reduce power supply from the feed circuit 168 of the backup PV power generation system 160.

In some embodiments, PV disconnect device 200 can be configured to disrupt the electrical connection between backup PV power generation system 160 and energy control system 110 based on the processing of voltage measurements. For example, if PV disconnect device 200 determines that the line-to-neutral voltage exceeds a first threshold, PV disconnect device 200 can then disrupt electrical connection between backup PV power generation system 160 and energy control system 110. In some embodiments, PV disconnect device 200 can be configured to disrupt the electrical connection within a predetermined time period that is compliant with state or national codes and product standards (e.g., UL 1741 and NEC 2020). For example, in some embodiments, the predetermined time period for establishing disruption of the electrical connection between backup PV power generation system 160 and energy control system 110 can be set at 160 milliseconds or less (e.g., disrupt electrical connection within 150 milliseconds, within 140 milliseconds).

In some embodiments, PV disconnect device 200 can be configured to disrupt the electrical connection between backup PV power generation system 160 and energy control system 110 based on the processing of frequency measurements. For example, if PV disconnect device 200 determines that there is an abnormal frequency event, PV disconnect device 200 can disrupt electrical connection between backup PV power generation system 160 and energy control system 110. In some embodiments, an abnormal frequency event can be defined when the measured frequency falls below or rises above the setpoint frequency (e.g., 50 and/or 60 Hz) by a predetermined tolerance threshold. In some embodiments, the setpoint frequency can range from about 50 Hz to about 70 Hz, such as for example, 59.5 Hz to 60.5 Hz to be compatible with the grid. In some embodiments, the predetermined tolerance threshold can range from 0 Hz to about 5 Hz, such as for example, 0.5 Hz to 1.5 Hz. In some embodiments, an abnormal frequency event can be defined when the occurrence of the measured frequency rising above or falling below the setpoint frequency happens more than a predetermined number of times within a set time period. In some embodiments, the predetermined number can range from 1 occurrence to 10 occurrences, such as, for example 3 occurrences to 5 occurrences. In some embodiments, the predetermined time period can range from about 0.1 milliseconds to about 10 minutes, such as, for example, about 10 milliseconds to about 5 seconds.

In some embodiments, after switching to the open state, PV disconnect device 200 can be set in the open state for a predetermined time period. In some embodiments, the predetermined time period can be determined dynamically by a control algorithm that continuously evaluates the state of electrical system 100 based on electronic data related to energy storage system 150, backup PV power generation system 160, the plurality of electrical loads 170, and/or the utility grid 184. By being dynamically controlled according to a control algorithm, the predetermined time period for keeping PV disconnect device 200 in an open state can be continuously adjusted in response to the detected conditions of electrical system 100. In some embodiments, the predetermined time period can be determined by a value set in a lookup table that is stored in a memory of a controller, such as, for example, controller 122 and/or PV monitoring system 130. By using a lookup table for determining the time period, PV disconnect device 200 can remain in an open state according to the value stored in the lookup table.

In some embodiments, PV disconnect device 200 can curtail power distributed from on-site generation (e.g., power distributed from backup PV power generation system 160 and/or energy storage system 150) to a predetermined power rating. In some embodiments, the predetermined power rating can be determined based on local Net Energy Metering (NEM) regulations or National Electrical Code 2020 PCS controls (e.g., ratings for electric panels). In some embodiments, PV disconnect device 200 can be configured to function as a net generation output meter so that the backup PV power generation system 160 and/or storage system 150 complies with local NEM regulations.

In some embodiments, PV disconnect device 200 can be compatible with any type of PV inverter 162 of backup PV power generation system 160, such as (e.g., an old legacy) PV inverters that lack the capability to control or curtail power output of the backup PV power generation system 160 based on smart inverter features such as frequency/watt. In some embodiments, PV disconnect device 200 can allow legacy PV inverters to comply with modern state or national codes and product standards, and to be compatible with the latest energy storage systems. For example, in some embodiments, PV disconnect device 200 can disrupt electrical connection between backup PV power generation system 160 and energy control system 110 based on an algorithm that compares backup PV power output to total and/or available storage capacity of energy storage system 150. In some embodiments, PV disconnect device 200 can be configured to perform all functions as described herein (e.g., monitor voltage and/or current measurements of feed circuit 168, process the voltage and/or current measurements, and disrupt electrical connection between backup PV power generation system 160 and energy control system 110) while microgrid interconnection device 120 is set in backup mode.

Figure 3:
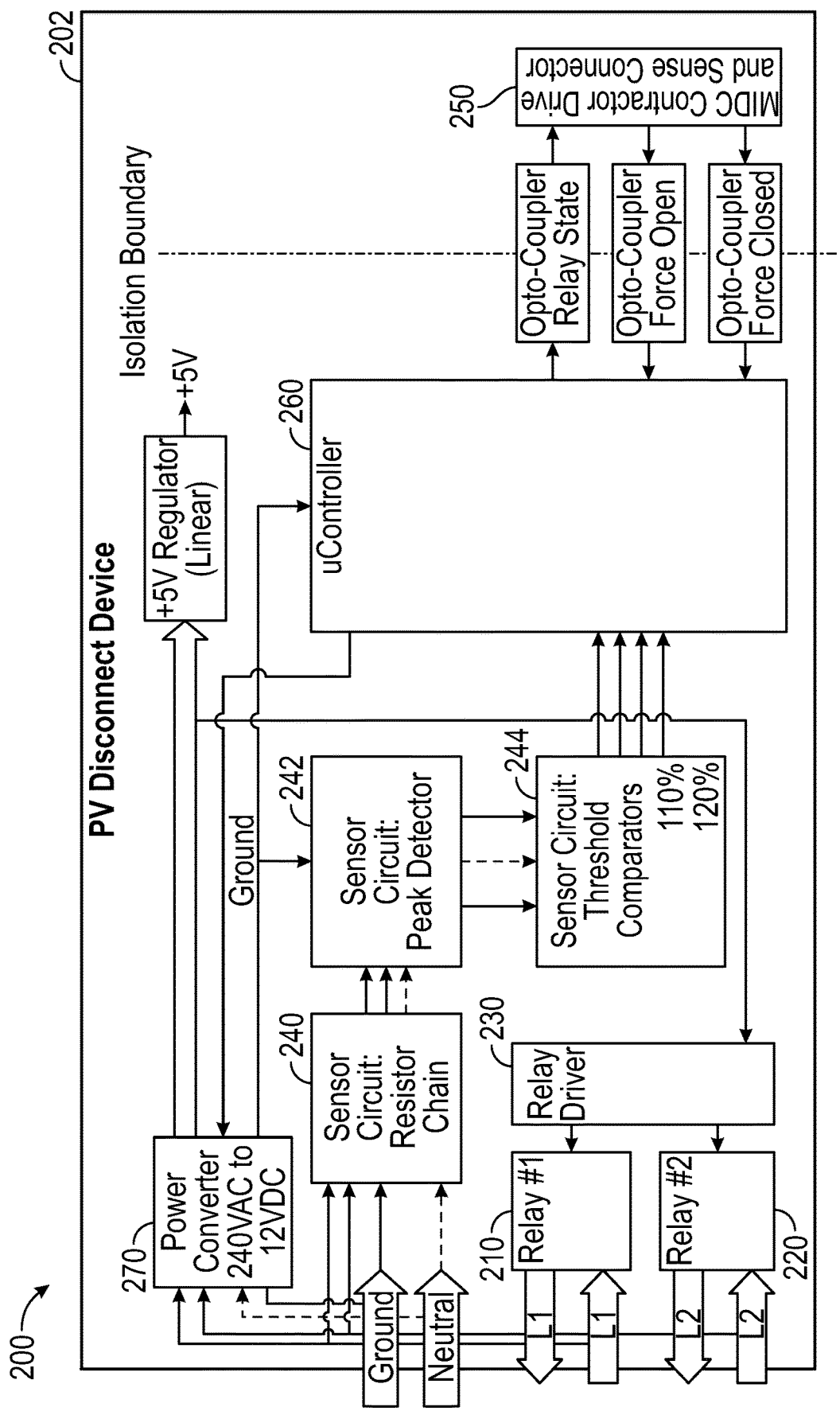
FIG. 3 illustrates a PV disconnect device according to an embodiment.

FIG. 3 shows a configuration of PV disconnect device 200 according to some embodiments. In some embodiments, PV disconnect device 200 can include a printed-circuit-board (PCB) 202. In some embodiments, PV disconnect device 200 can include one or more relay component (e.g., electromechanical relay, solid-state relay). In some embodiments, the relay component of the PV disconnect device 200 can include a first relay 210 disposed on PCB 202 and electrically coupled to a first line L1 of the feed circuit 168 from backup PV power generation system 160. In some embodiments, the relay component of the PV disconnect device 200 can include a second relay 220 disposed on PCB 202 and electrically coupled to a second line L2 of the feed circuit 168 from backup PV power generation system 160. In some embodiments, the relay component of the PV disconnect device 200 can include a relay driver 230 configured to actuate first relay 210 and/or second relay 220. In some embodiments, first and second relays 210, 220 each include a coil and an armature, and relay driver 230 is configured to energize the coils of first and second relays 210, 220 to move the armature between open and closed positions. In some embodiments, the relay component can include two poles to actuate both the phases (L1 and L2) simultaneously within the relay disconnect device 200.

In some embodiments, PV disconnect device 200 can include sensor circuit 240, 242, 244 (e.g., a standard resistor chain and signal filter) disposed on PCB 202 and configured to measure voltage and/or current across the feed circuit 168 of backup PV power generation system 160. In some embodiments, sensor circuit 240, 242, 244 can include any type of circuitry component (e.g., a voltmeter, resistor chain, signal filter, a potential transformer, and/or a current transformer), to measure voltage and/or current across the feed circuit 168 of backup PV power generation system 160. As shown in FIG. 3, sensor circuit 240, 242, 244 can be electrically coupled to first phase line L1, second phase line L2, neutral line, and/or ground line of the feed circuit 168 from backup PV power generation system 160. In some embodiments, sensor circuit 240, 242, 244 can be connected only to first phase line L1, second phase line L2, and/or neutral line, not the ground line. In some embodiments, sensor circuit 240-244 is configured to measure voltage and/or current across the feed circuit 168 of the backup PV power generation system 160 in reference to the neutral wire of the feed circuit 168 (line-to-neutral).

In some embodiments, PV disconnect device 200 can include a connector port 250 electrically coupled to energy control system 110, to allow, for example, opto-coupled signaling between energy control system 110 and PV disconnect device 200. In some embodiments, connector port 250 is configured to allow force open, force closed, and autonomous operation signaling between the energy control system 110 and PV disconnect device 200. In some embodiments, connector port 250 can include any type of circuit to establish an electrical connection with energy control system 110. In some embodiments, connector port 250 is configured to allow "relay state sense feedback" between energy control system 110 and PV disconnect device 200. In some embodiments, connector port 250 can define the isolation boundary between the feed circuit 168 from backup PV power generation system 160 and energy control system 110.

In some embodiments, PV disconnect device 200 can include a relay controller 260 (e.g., a microcontroller) disposed on PCB 202 and operatively connected to first relay 210, second relay 220, relay driver 230, sensor circuit 240-244, and/or connector port 250. In some embodiments, relay controller 260 can be configured to receive the voltage measurements from sensor circuit 240-244. In some embodiments, relay controller 260 can be configured to actuate relay driver 230 to open and/or close first relay 210 and/or second relay 220. In some embodiments, relay controller 260 can be configured to transmit through relay driver 230 a first drive signal to the first relay 210 and a second drive signal to second relay 220 to actuate electrical disconnection between backup PV power generation system 160 and energy control system 110. In some embodiments, the relay controller 260 can transmit the first and second drive signals simultaneously. In some embodiments, relay controller 260 can include an analog-to-digital converter to convert analog signals received from sensor circuit 240-244 to digital signals. In some embodiments, relay controller 260 can include a processor for processing input signals and sending commands via output signals.

In some embodiments, relay controller 260 can include memory for storing, for example, information about storage system 150, backup PV power generation system 160, non-backup PV power generation system 190, and/or energy control system 110. In some embodiments, relay controller 260 can include firmware stored in the memory of relay controller 260 for controlling operation of PV disconnect device 200. In some embodiments, the firmware of relay controller 260 can include algorithms, including any of the algorithms described herein, that enable the relay controller 260 to process voltage measurements from sensor circuit 240-244. In some embodiments, execution of the stored algorithms can allow relay controller 260 to detect peak voltage and compare data (e.g., voltage measurements of the feed circuit 168, power output of backup PV power generation system 160) to predetermined thresholds. In some embodiments, execution of the firmware can allow the relay controller 260 to process power output data of backup PV power generation system 160 and actuate relay driver 230 based on the processed voltage measurements.

In some embodiments, PV disconnect device 200 can include a power converter 270 electrically coupled to feed circuit 168 from backup PV power generation system 160. In some embodiments, power converter 270 can be configured to reduce the voltage inputted from the feed circuit 168 of the backup PV power generation system 160 to a minimal operating voltage. In some embodiments, power converter 270 can convert AC inputted from the feed circuit 168 of the backup PV power generation system 160 to DC that is used to power components of PV disconnect device 200, such as relay controller 260. In some embodiments, power converter 270 can include any type of circuitry, such as input fuses, resistors, semiconductors, inductance coils, and transformers, to convert between AC/DC and reduce input voltage.

Figure 4:
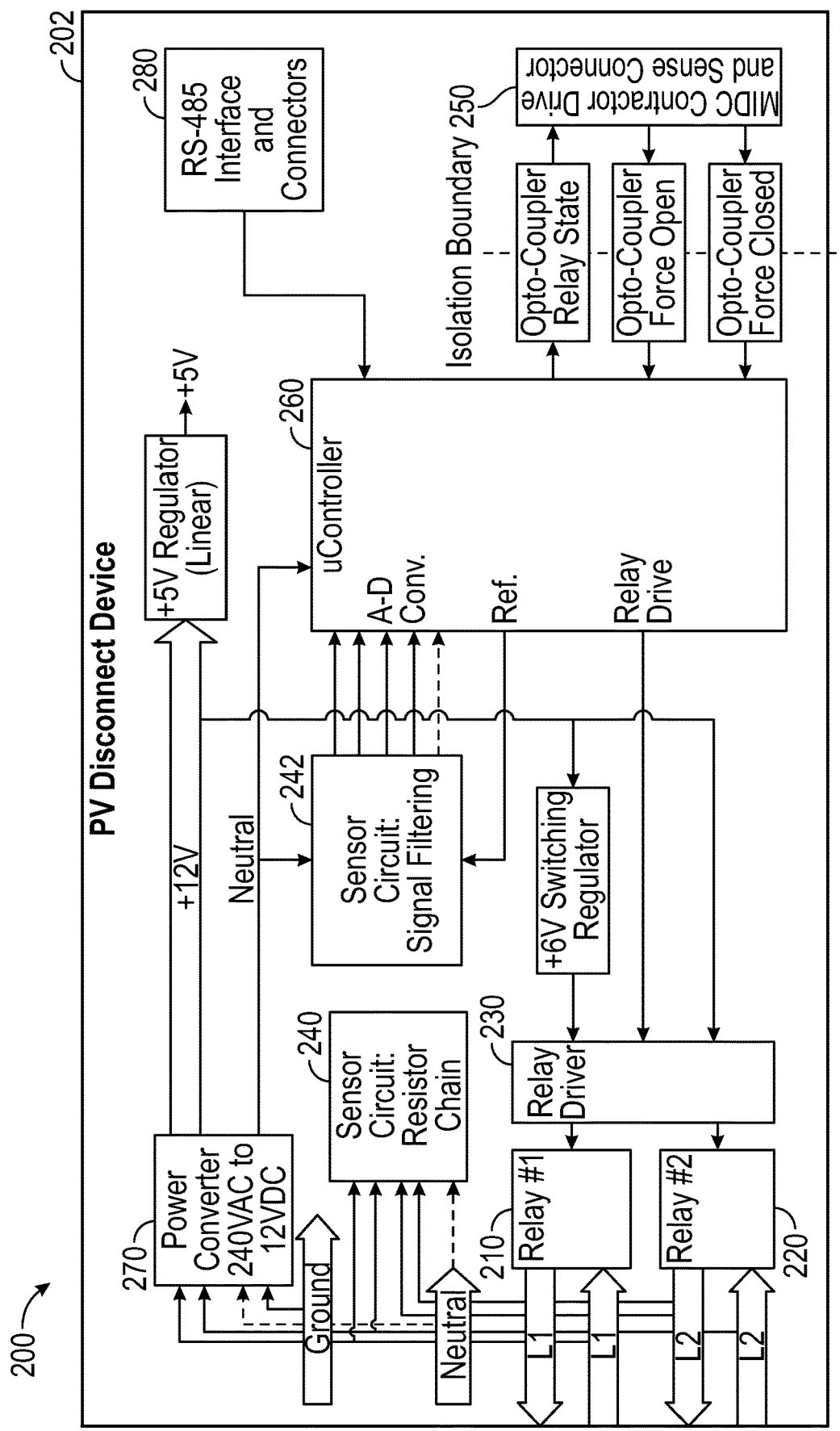
FIG. 4 illustrates a PV disconnect device according to an embodiment.

FIG. 4 shows a configuration of a PV disconnect device 200 according to some embodiments. PV disconnect device 200 as shown in FIG. 4 can include the same or similar features as the embodiments of PV disconnect device described herein (e.g., PV disconnect device 200 shown in FIG. 3), including PCB 202, first relay 210, second relay 220, relay driver 230, sensor circuit 240-244, connector port 250, relay controller 260, and/or power converter 270. In some embodiments, as shown in FIG. 4 for example, PV disconnect device 200 can include an interface 280 that is configured to communicate with other components of electrical system 100, such as controller 122 and PV monitoring system 130 of energy control system 110, PV inverter 162 of backup PV power generation system 160, and/or storage converter 154 of storage system 150. In some embodiments, interface 280 can communicate according to RS-485 (e.g., modbus) or CAN standard or any other similar communication standard.

In some embodiments, PV disconnect device 200 can be integrated with other components of electrical system 100, including any component in energy control system 110, energy storage system 150, and backup PV power generation system 160. In some embodiments, as shown in FIG. 2 for example, PV disconnect device 200 can be integrated with controller 1500 of energy control system 110.

Figure 5:
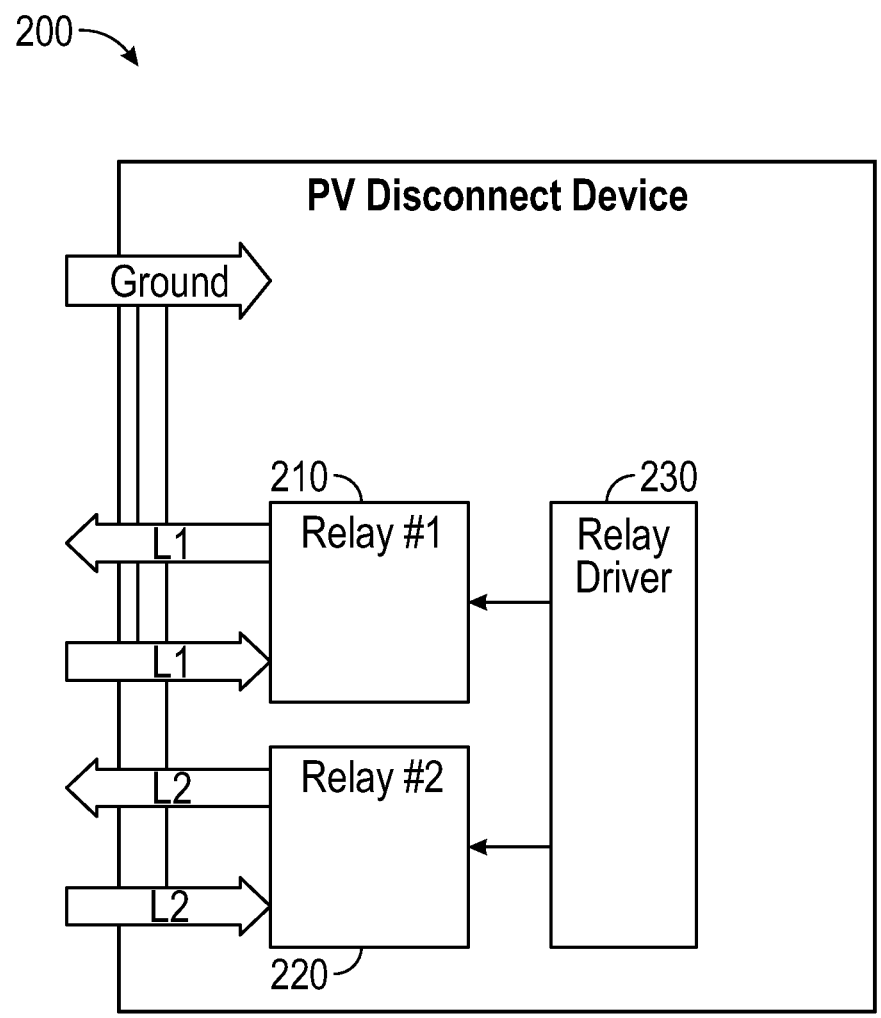
FIG. 5 illustrates a PV disconnect device according to an embodiment.

In some embodiments, as shown in FIG. 5 for example, PV disconnect device 200 can include only a relay component, such as first relay 210, second relay 220, and relay driver 230, without having sensor circuit, a controller, a connector port, and/or a power converter. In some embodiments, such as the configuration shown in FIG. 5, PV disconnect device 200 can be controlled by controller 122, which receives voltage measurements of the feed circuit 168 from backup PV power generation system 160 and actuates relay driver 230 of PV disconnect device 200 based on processing of the voltage and/or current measurements. In some embodiments, the sensor circuit 240-244, the relay controller 260, the connector port 250, and/or the power converter 270, as described herein with respect to the embodiments shown in FIGS. 3 and 4, for example, can be located on the PCB of controller 122 or PV monitoring system 130.

FIGS. 6-9 show embodiments of integrating energy control system 110 and one or more PV disconnect devices (e.g., PV disconnect device 200, a first PV disconnect device 200A, and a second PV disconnect device 200B) with different electrical systems having various types of loads, PV power generation configurations, and energy storage capacities. Similar to the embodiment shown in FIG. 1, each of the electrical systems shown in FIGS. 6-9 can include energy control system 110, backup PV interconnection 111, storage interconnection 112, backup load interconnection 113, non-backup interconnection 115, grid interconnection 116 with non-backup power bus 180, microgrid interconnection device 120, housing 121, controller 122, energy storage system 150, backup PV power generation system 160 having one or more power generation arrays 164, and a plurality of backup loads 172. In some embodiments, each of the electrical systems shown in FIGS. 6-9 can include any other feature from the embodiment shown in FIG. 1.

Figure 6:
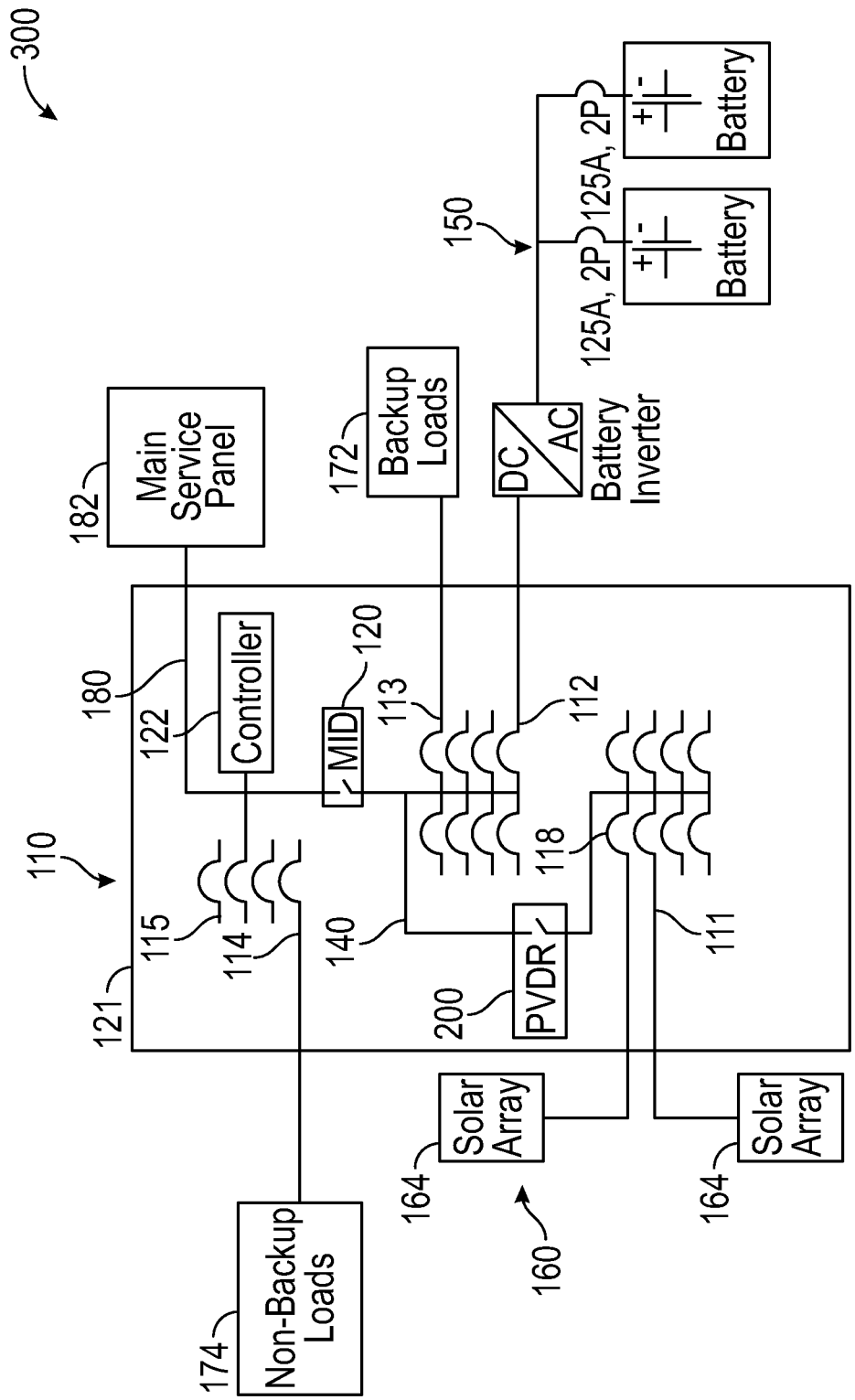
FIG. 6 illustrates an energy control system with a PV disconnect device disposed in a housing of a controller according to an embodiment.

FIG. 6 shows an electrical system 300, according to an embodiment, in which PV disconnect device 200 is disposed within housing 121 of energy control system 110. As shown in FIG. 6, in some embodiments, energy control system 110 can include microgrid interconnection device 120 and controller 122 disposed in housing 121. In some embodiments, energy control system 110 can include backup power bus 140 electrically coupled to a backup side (e.g., a load side) of microgrid interconnection device 120, for example, via a load-side lug. In some embodiments, backup power bus 140 can be electrically coupled to backup PV power generation system 160 via backup PV interconnection 111, energy storage system 150 via storage interconnection 112, and the plurality of backup loads 172 via backup load interconnection 113. In some embodiments, energy control system 110 can include non-backup power bus 180 electrically coupled to a non-backup side (e.g., a line side) of micro-grid interconnection device 120. In some embodiments non-backup power bus 180 can be electrically coupled to over-current-protection device 182 (e.g., main service panel with a main circuit breaker, such as a 200 A circuit breaker) that is electrically coupled to the utility grid. Due to wiring protection in electrical regulations, for example, PV disconnect device 200 cannot be electrically located between PV power generation arrays 164 and AC breakers 118, which, for example, are located along backup PV interconnection 111. Accordingly, in some embodiments, PV disconnect device 200 can be electrically coupled to backup power bus 140 and disposed inside housing 121 so that AC breaker 118 protects PV disconnect device 200 from power surges carrying high amperage currents (e.g., 20 amps or greater).

While only one PV disconnect device 200 is shown in FIG. 6, electrical system 300 can include multiple PV disconnect devices disposed at different locations in electrical system 300 such that each PV disconnect device 200 is configured to decouple a respective PV power generation array 164 from energy control system 110. In some embodiments, each PV disconnect device 200 can be controlled independently (e.g., by controller 122 and/or PV monitoring system 130) to selectively decouple a respective PV power generation array 164 from energy control system 110. By selectively disconnecting any one of PV power generation arrays 164 through independent control of multiple PV disconnect devices 200, energy control system 110 can reduce power output from part of backup PV power generation system 160 while maintaining power output from the remainder of backup PV power generation system 160. In some embodiments, all PV disconnect devices 200 can be controlled collectively (e.g., at the same time) such that all PV power generation arrays 164 can be electrically decoupled from energy control system 110 (e.g., simultaneously). By collectively controlling all PV disconnect devices 200 simultaneously, energy control system 110 can reduce the entire power output from backup PV power generation system 160 in response to one or more conditions, such as, for example, when batteries 158 are fully charged or when rapid power shutdown is demanded by a user.

Figure 7:
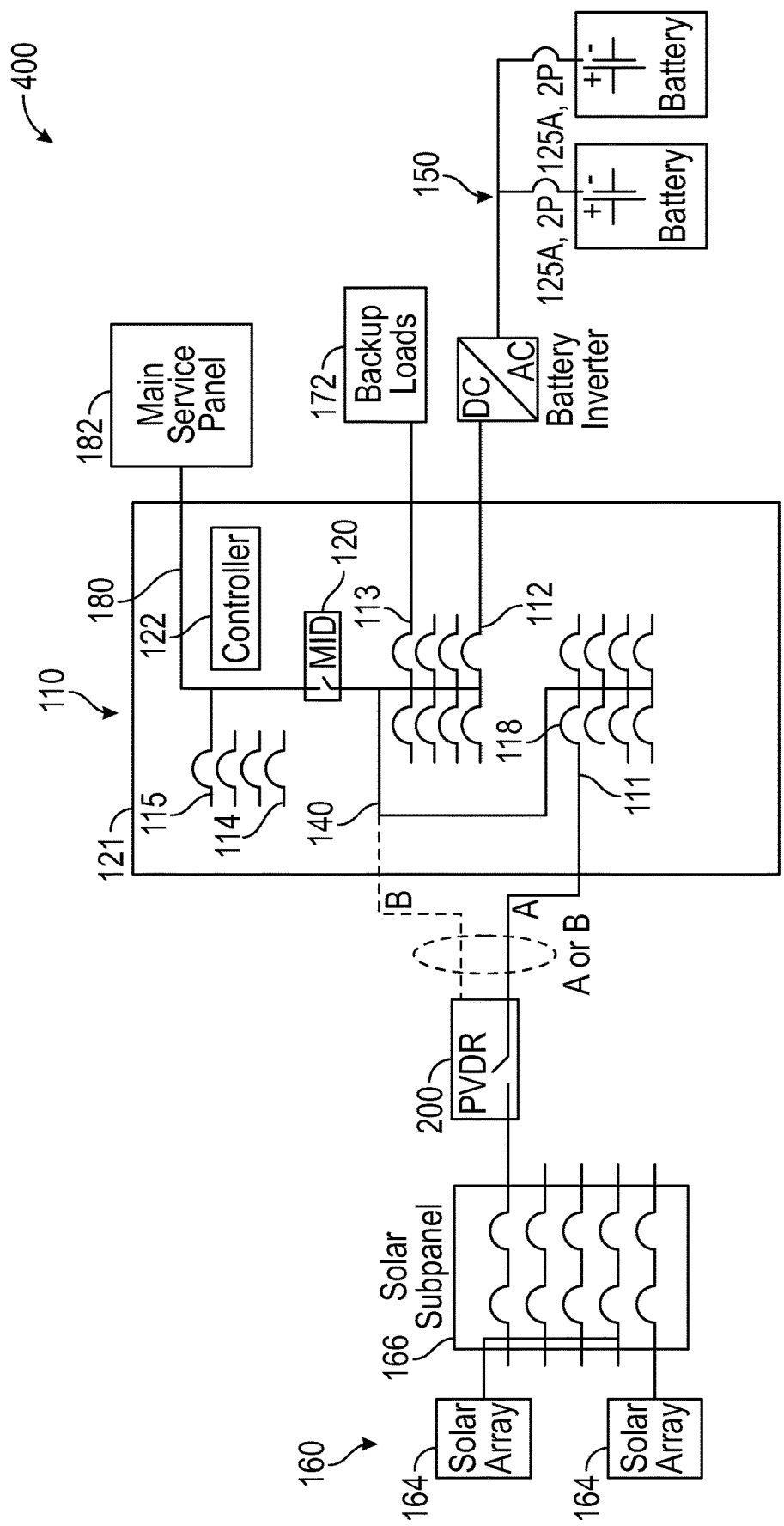
FIG. 7 illustrates an energy control system with a PV disconnect device disposed outside a housing of a controller according to an embodiment.

FIG. 7 shows an electrical system 400, according to an embodiment, in which PV disconnect device 200 is disposed outside of housing 121 of energy control system 110. For example, electrical system 400 can be retrofitted with components (e.g., a subpanel) of backup PV power generation system 160 that were installed before implementation of energy control system 110. As shown in FIG. 7, in some embodiments, backup PV power generation system 160 can include a subpanel 166 electrically coupled to a plurality of PV power generation arrays 164 and electrically coupled to energy control system 110. In some embodiments, PV disconnect device 200 can be disposed outside of housing 121. In some embodiments, as shown by pathway A, PV disconnect device 200 can be electrically coupled (e.g., directly wired) to PV interconnection 111 if subpanel 166 does not have an existing primary overcurrent protection device. In some embodiments, as shown by pathway B, PV disconnect device 200 can be electrically coupled (e.g., directly wired) to backup power bus 140 if subpanel 166 has an existing primary overcurrent protection device.

While only one PV disconnect device 200 is shown in FIG. 7, electrical system 400 can include multiple PV disconnect devices disposed at different locations in electrical system 400 such that each PV disconnect device 200 is configured to decouple a respective PV power generation array 164 from energy control system 110. In some embodiments, each PV disconnect device 200 can be controlled independently (e.g., by controller 122 and/or PV monitoring system 130) to selectively decouple a respective PV power generation array 164 from energy control system 110. By selectively disconnecting any one of PV power generation arrays 164 through independent control of multiple PV disconnect devices 200, energy control system 110 can reduce power output from part of backup PV power generation system 160 while maintaining power output from the remainder of backup PV power generation system 160. In some embodiments, all PV disconnect devices 200 can be controlled collectively (e.g., at the same time) such that all PV power generation arrays 164 can be electrically decoupled from energy control system 110 (e.g., simultaneously). By collectively controlling all PV disconnect devices 200 simultaneously, energy control system 110 can reduce the entire power output from backup PV power generation system 160 in response to one or more conditions, such as, for example, when batteries 158 are fully charged or when rapid power shutdown is demanded by a user.

Figure 8:
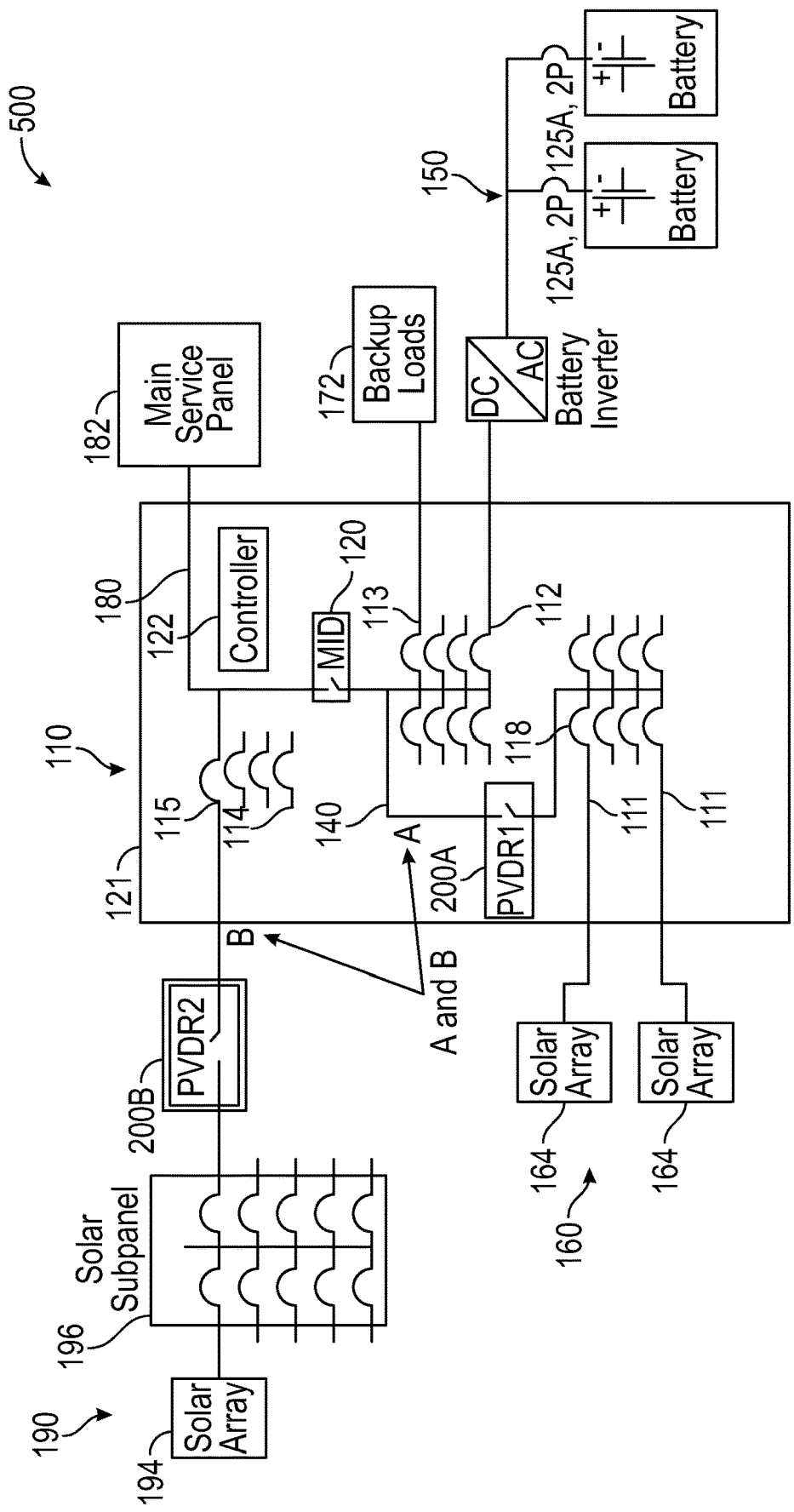
FIG. 8 illustrates an energy control system with a first PV disconnect device disposed on a backup side and a second PV disconnect device disposed on a non-backup side according to an embodiment.

FIG. 8 shows an electrical system 500, according to an embodiment, including a first PV disconnect device 200A disposed upstream of the backup side of microgrid interconnection device 120 (e.g., within housing 121) and a second PV disconnect device 200B disposed upstream of the non-backup side of microgrid interconnection device 120 (e.g., outside of housing 121). In some embodiments, first and second PV disconnect devices 200A-B can include any component of the other embodiments of PV disconnect devices described herein. In some embodiments, first PV disconnect device 200A can be electrically coupled to backup power bus 140 and disposed inside housing 121 (e.g., along pathway A), similar to the location of PV disconnect device 200 shown in FIG. 6. As shown in FIG. 8, electrical system 500 can include non-backup PV power generation system 190 having one or more PV power generation arrays 194 electrically coupled to a subpanel 196. In some embodiments, second PV disconnect device 200B can be disposed downstream of at least one non-backup power generation array 194 and upstream of the non-backup side of microgrid interconnection device 120, where second PV disconnect device 200B is disposed outside of housing 121 (e.g., along pathway B). Because AC beakers need to be electrically upstream of second PV disconnect device 200B, non-backup PV power generation system 190 includes subpanel 196 (e.g., with AC breakers 197) disposed upstream of second PV disconnect device 200B. In some embodiments, second PV disconnect device 200B is electrically coupled to non-backup PV interconnection 115. In some embodiments, second PV disconnect device 200B can include its own housing (e.g., non-metallic housing).

The arrangement of second PV disconnect device 200B allows the electrical system to increase the power generation capacity of a PV power generation system while still affording protection to backup power bus 140 such that backup power bus 140 remains compliant with National Electrical Code (NEC) 2020 PCS controls (e.g., ratings for electric panels). For example, if a user would like to have a total of 100 kW of power output by a PV power generation system using a 100 A rated backup power bus 140, a majority of the total 100 kW power output (e.g., 80 kW) can be provided by non-backup PV power generation system 190 backup PV power generation system 160, whereas a smaller fraction (e.g., 20 kW) of the total 100 kW power output can be provided by the backup PV power generation system 160. The second PV disconnect device 200B allows controller 122 to eliminate power supply from non-backup PV power generation system 190 to meet national standards like NEC 2020 or Rapid shut down functionality.

While only two PV disconnect devices 200A, 200B are shown in FIG. 8, electrical system 500 can include multiple PV disconnect devices disposed at different locations in electrical system 500 such that each PV disconnect device 200 is configured to decouple a respective PV power generation array 164, 194 from energy control system 110. In some embodiments, each PV disconnect device 200A, 200B can be controlled independently (e.g., by controller 122 and/or PV monitoring system 130) to selectively decouple a respective PV power generation array 164, 194 from energy control system 110. By selectively disconnecting any one of PV power generation arrays 164, 194 through independent control of multiple PV disconnect devices 200A, 200B, energy control system 110 can reduce power output from part of backup PV power generation system 160 and/or non-backup PV power generation system 190 while maintaining power output from the remainder of backup PV power generation system 160 and/or non-backup PV power generation system 190. In some embodiments, all PV disconnect devices 200 can be controlled collectively (e.g., at the same time) such that all PV power generation arrays 164, 194 can be electrically decoupled from energy control system 110 (e.g., simultaneously). By collectively controlling all PV disconnect devices 200 simultaneously, energy control system 110 can reduce the entire power output from backup PV power generation system 160 and/or non-backup PV power generation system 190 in response to one or more conditions, such as, for example, when batteries 158 are fully charged or when rapid power shutdown is demanded by a user.

Figure 9:
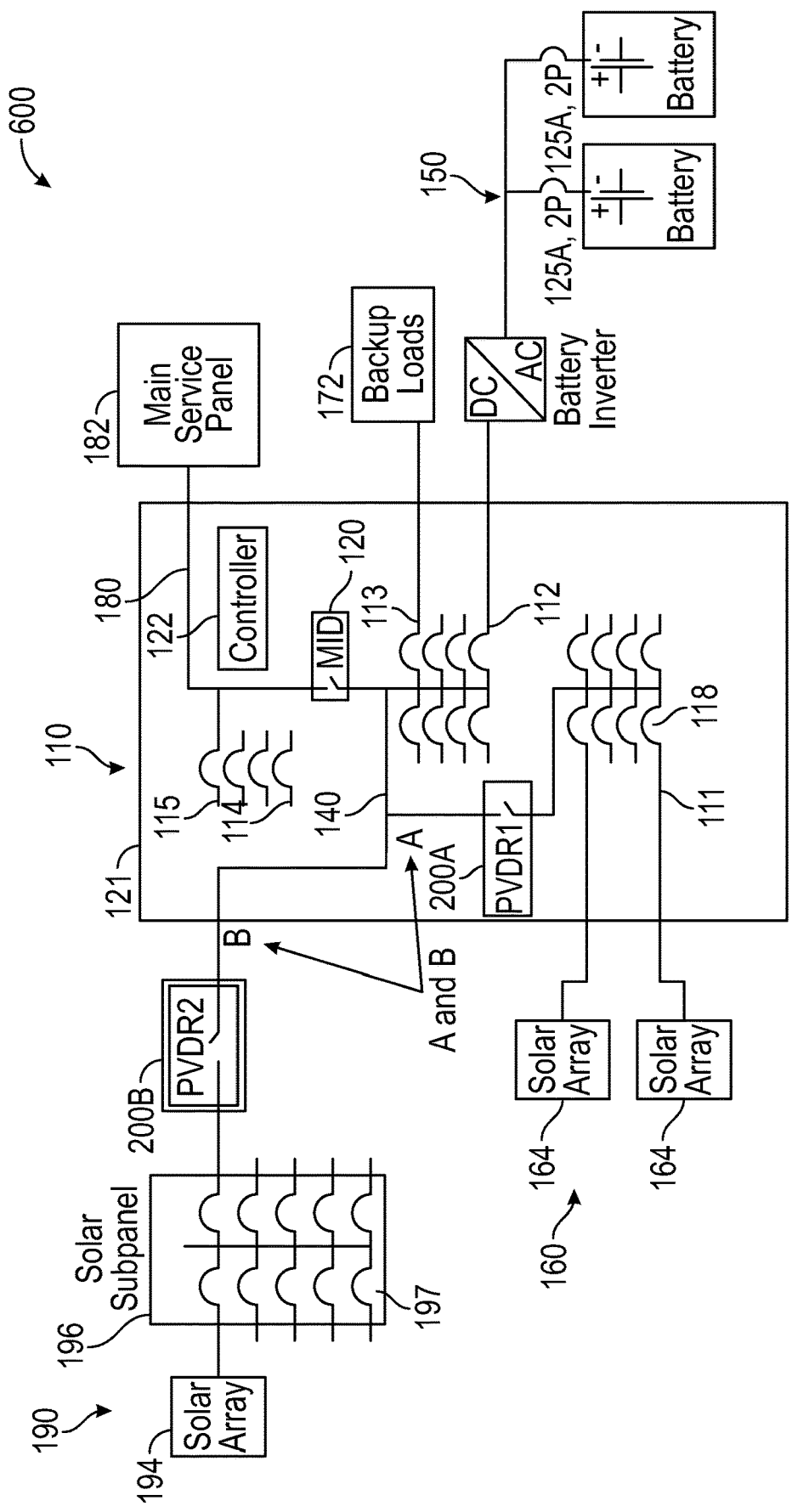
FIG. 9 illustrates an energy control system with a first PV disconnect device disposed at a first location on a backup side of the energy control system and a second PV disconnect device disposed at a second location on the backup side of the energy control system according to an embodiment.

FIG. 9 shows an electrical system 600, according to an embodiment, including first PV disconnect device 200A and second PV disconnect device 200B both disposed upstream of the backup side of microgrid interconnection device. As shown in FIG. 9, first PV disconnect device 200A can be electrically coupled to backup power bus 140 and disposed inside housing 121 (e.g., along pathway A), similar to the location of PV disconnect device 200 shown in FIG. 6. In some embodiments, electrical system 600 can include backup PV power generation system 160 having a high power output capacity (e.g., 30 kW or greater) such that backup PV power generation system 160 includes additional power generation arrays 164 and one or more subpanels 166 electrically coupled to additional power generation arrays 164. In some embodiments, second PV disconnect device 200B can be disposed downstream of additional power generation arrays 194 and subpanel 196, where second PV disconnect device 200B is disposed outside of housing 121 (e.g., along pathway B). In some embodiments, second PV disconnect device 200B can include its own housing. In some embodiments, subpanel 196 includes one or more AC breakers 197 to protect second PV disconnect device 200B from excess current. The arrangement of first and second PV disconnect devices 200A-B shown in FIG. 9 allows a user to place more backup PV power output while still affording backup power bus 140 to remain compliant with NEC 2020 PCS controls (e.g., ratings for electric panels).

While only two PV disconnect devices 200A, 200B are shown in FIG. 9, electrical system 600 can include multiple PV disconnect devices disposed at different locations in electrical system 600 such that each PV disconnect device 200 is configured to decouple a respective PV power generation array 164, 194 from energy control system 110. In some embodiments, each PV disconnect device 200A, 200B can be controlled independently (e.g., by controller 122 and/or PV monitoring system 130) to selectively decouple a respective PV power generation array 164, 194 from energy control system 110. By selectively disconnecting any one of PV power generation arrays 164, 194 through independent control of multiple PV disconnect devices 200A, 200B, energy control system 110 can reduce power output from part of backup PV power generation system 160 and/or non-backup PV power generation system 190 while maintaining power output from the remainder of backup PV power generation system 160 and/or non-backup PV power generation system 190. In some embodiments, all PV disconnect devices 200 can be controlled collectively (e.g., at the same time) such that all PV power generation arrays 164, 194 can be electrically decoupled from energy control system 110 (e.g., simultaneously). By collectively controlling all PV disconnect devices 200 simultaneously, energy control system 110 can reduce the entire power output from backup PV power generation system 160 and/or non-backup PV power generation system 190 in response to one or more conditions, such as, for example, when batteries 158 are fully charged or when rapid power shutdown is demanded by a user.

Figure 10:
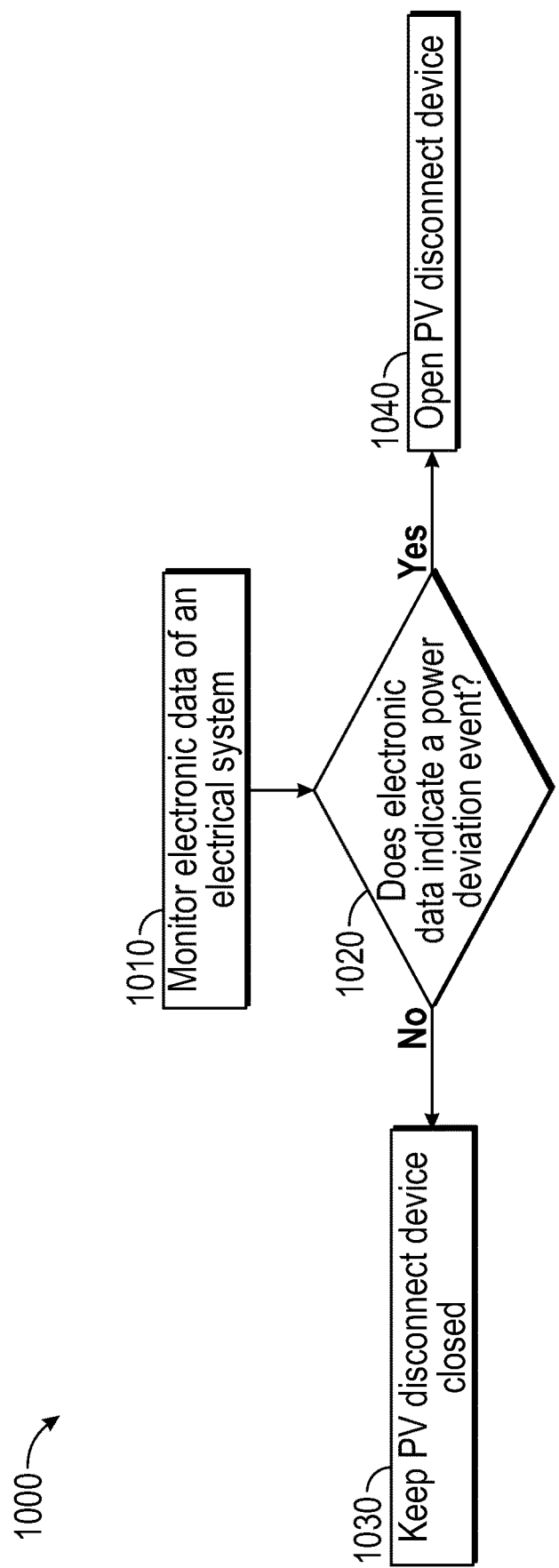
FIG. 10 illustrates a block diagram showing a method of controlling a PV disconnect device according to an embodiment.

FIG. 10 shows an example block diagram illustrating a method 1000, according to an embodiment, of controlling a PV disconnect device (e.g., PV disconnect device 200, a first PV disconnect device 200A, and/or a second PV disconnect device 200B) by a controller, such as, for example, controller 122 and/or PV monitoring system 130 of microgrid interconnection device 120. One or more aspects of method 1000 can be implemented using hardware, software modules, firmware, tangible computer readable media having instructions stored thereon, or a combination thereof and can be implemented in one or more computer systems or other processing systems.

In some embodiments, method 1000 can include a step 1010 of monitoring electronic data of an electrical system (e.g., any of the electrical systems described herein, such as electrical system 100). In some embodiments, step 1010 can include receiving (e.g., by controller 122) electronic data related to backup PV power generation system 160, energy storage system 150, utility grid 184, the plurality of backup loads 172, and/or non-backup loads 174. For example, in some embodiments, electronic data related to backup PV power generation system 160 can include a detected power output of backup PV power generation system 160. In some embodiments, electronic data related to backup PV power generation system 160 can include a frequency of the power supplied by backup PV power generation system 160. In some embodiments, electronic data related to energy storage system 150 can include an available storage capacity. In some embodiments, electronic data related to the plurality of backup loads 172 can include a current backup load demand. In some embodiments, electronic data related to the plurality of non-backup loads 174 can include a current non-backup load demand. In some embodiments, electronic data related to utility grid 184 can include an operating status of utility grid 184 electrically coupled to microgrid interconnection device 120 (e.g., grid-tied or power outage).

In some embodiments, method 1000 can include a step 1020 of determining whether the monitored electronic data indicates a power deviation event. In some embodiments, a power deviation event can be when power supplied to backup power bus 140 exceeds a threshold (e.g., 120% of bus bar rating) that would overwhelm electrical system 100.

In some embodiments, step 1020 can include comparing the measured power output of backup PV power generation system 160 to the available storage capacity of energy storage system 150. In some embodiments, a power deviation event occurs when the power output of backup PV power generation system 160 is greater than the available storage capacity of energy storage system 150. For example, backup PV power generation system 160 can supply up to a 15 kW power output, and energy storage system 150 has a total storage capacity of 6 kW. During the middle of the morning (e.g., 11:00 AM), when the power output of backup PV power generation system 160 is climbing (e.g., measured power output 7 kW), controller 122 can detect that the 7 kW power output by backup PV power generation system 160 is greater than the storage capacity of energy storage system 150, and therefore, determine that a power deviation event has occurred.

In some embodiments, step 1020 can include determining whether the load demand by backup loads 172 and/or non-backup loads 174 decreases below a threshold value within a set time period (e.g., an excessive load drop). In some embodiments, the threshold value for a load demand drop can range from about 5 kW to about 10 kW, such as, for example, about 5 kW to about 7.5 kW. In some embodiments, the time period can range from about 1 second to about 1 hour, such as for example, about 1 minute to about 5 minutes.

In some embodiments, step 1020 can include detecting when the operating status of utility grid 184 indicates a power outage. When there is a power outage, microgrid interconnection device 120 switches to the backup mode in which microgrid interconnection device 120 electrically disconnects non-backup power bus 180 from backup power bus 140. When microgrid interconnection device 120 is set in backup mode, any power output by backup PV power generation system 160 that is in excess of the load demand cannot be synced back to the utility grid, thereby potentially resulting in a large power differential that can overwhelm energy control system 110. Accordingly, in some embodiments, controller 122 can determine that a power deviation event has occurred when immediately detecting a power outage of the utility grid.

In some embodiments, step 1020 can include detecting the number of times that a measured frequency of the power supplied by backup PV power generation system 160 exceeds a setpoint frequency, such as, for example a 60 Hz setpoint frequency that is compliant with the utility grid. The frequency of backup PV power generation system 160 increases when the rate of power supply exceeds the charging rate of storage of energy storage system 150 and/or backup load demand. In some embodiments, electrical system 100 can operate according to a frequency-watt PV curtailment scheme, in which converters curtail power output of backup PV power generation system 160 when the measured frequency rises above a setpoint frequency (e.g., 60 Hz). However, frequency-watt control can be too slow to adjust PV power output, thereby resulting in the frequency of PV power supply rising above the setpoint frequency multiple times in a day. For example, even if the power output of backup PV power generation system is relatively small (e.g., about 3 kW to about 5 kW), the frequency of power supply can still rise above the set point frequency if there is current low backup load demand (e.g., about 200 W to about 300 W) and the energy storage system 150 is at a high state of charge (e.g., about 97% to about 99%). Accordingly, in some embodiments, controller 122 can determine that a power deviation event has occurred when the monitored frequency of the power supplied by the backup PV power generation system 160 rises above a setpoint frequency (e.g., 60 Hz) more than a maximum number of times within a set time period. In some embodiments, the maximum number of times can range from 1 time to 10 times, such as, for example, 3 to 4 times. In some embodiments, the set time period can range from 1 minute to 48 hours, such as for example, 3 hours to 24 hours.

In some embodiments, method 1000 can include a step 1030 of keeping PV disconnect device 200 closed when not detecting a power deviation event based on the monitored electronic data. For example, if the available storage capacity or load demand matches or exceeds the measured power output, controller 122 cannot actuate PV disconnect device 200 so that power supply by backup PV power generation system 160 can still be utilized to meet load demand or charge the energy storage system 150.

In some embodiments, method 1000 can include a step 1040 of opening PV disconnect device 200 when detecting a power deviation event based on the monitored electronic data. For example, once the monitored power output of the backup PV power generation system 160 exceeds the available storage capacity of energy storage system 150, controller 122 can actuate PV disconnect device 200 to be open within a predetermined response time (e.g., about 10 milliseconds to about 40 milliseconds) to prevent any potential damage to the electrical system. In some embodiments, controller 122 can then keep PV disconnect device 200 open for a predetermined time period (e.g., about 3 hours to about 5 hours) to avoid rising PV power output during the daytime or allow sufficient amount of time for the energy storage system 150 to increase its storage capacity. In another example, when there is an excessive load drop or a power outage, controller 122 can actuate PV disconnect device 200 to be open within a predetermined response time (e.g., about 10 milliseconds to about 40 milliseconds) to prevent any potential damage or disruption to the electrical system. In another example, when the when the monitored frequency of the power supplied by backup PV power generation system 160 rises above the setpoint frequency more than a maximum number of times (e.g., two, three, or four times) within a set time period (e.g., four hours, 12 hours, 24 hours), controller 122 can actuate PV disconnect device 200 to be open within a predetermined response time (e.g., about 10 milliseconds to about 40 milliseconds) to prevent potential damage to the electrical system.

Figure 11:
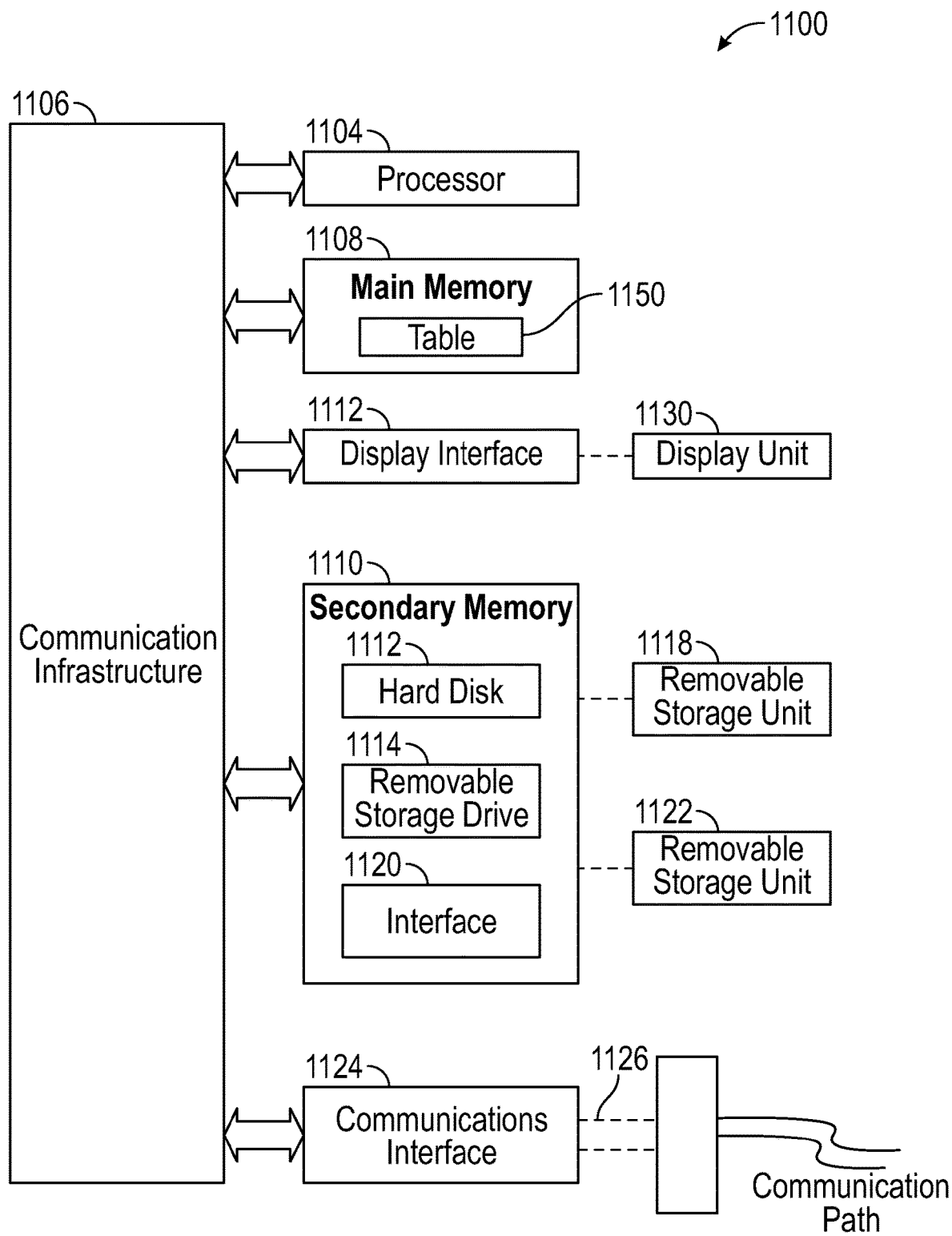
FIG. 11 illustrates a block diagram showing aspects of a computer system according to an embodiment.

FIG. 11 illustrates an example computer system 1100 that can be implemented in controller 122, PV monitoring system 130, and/or PV disconnect device 200. In some embodiments, computer system 1100 can include a processor device 1104. Processor device 1104 can be a special purpose or a general purpose processor device. As will be appreciated by persons skilled in the relevant art, processor device 1104 can also be a single processor in a multi-core/multiprocessor system, such system operating alone, or in a cluster of computing devices operating in a cluster or server farm. Processor device 1104 can be connected to a communication infrastructure 1106, for example, a bus, message queue, network, or multi-core message-passing scheme.

In some embodiments, computer system 1100 can include a main memory 1108, for example, read only memory (ROM) and/or random access memory (RAM), and can also include a secondary memory 1110. Secondary memory 1110 can include, for example, a hard disk drive 1112, and/or removable storage drive 1114. Removable storage drive 1114 can include a floppy disk drive, a magnetic tape drive, an optical disk drive, a flash memory, a Universal Serial Bus (USB) drive, or the like. The removable storage drive 1114 reads from and/or writes to a removable storage unit 1118 in a well-known manner. Removable storage unit 1118 can include a floppy disk, magnetic tape, optical disk, etc. which is read by and written to by removable storage drive 1114. As will be appreciated by persons skilled in the relevant art, removable storage unit 1118 includes a computer usable storage medium having stored therein computer software instructions and/or data.

In some embodiments, computer system 1100 can include a display interface 1102 (which can include input and output devices such as keyboards, mice, etc.) that presents graphics, text, and other data from communication infrastructure 1106 (or from a frame buffer not shown) for display, for example, on display unit 1130.

In some embodiments, secondary memory 1110 can include other similar means for allowing computer programs or other instructions to be loaded into computer system 1100. Such means can include, for example, a removable storage unit 1122 and an interface 1120. Examples of such means can include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 can also include a communication interface 1124. Communication interface 1124 allows software and data to be transferred over a network between computer system 1100 and external devices. Communication interface 1124 can include a modem, a network interface (such as an Ethernet card), a communication port, a PCMCIA slot and card, or the like. Software and data transferred via communication interface 1124 can be in the form of signals, which can be electronic, electromagnetic, optical, or other signals capable of being received by communication interface 1124. These signals can be provided to communication interface 1124 via a communication path 1126. Communication path 1126 carries signals and can be implemented using wire or cable, fiber optics, a phone line, a cellular phone link, an RF link or other communication channels.

In the context of the present disclosure, the terms "computer program medium" and "computer usable medium" are used to generally refer to media such as removable storage unit 1118, removable storage unit 1122, and a hard disk installed in hard disk drive 1112. Computer program medium and computer usable medium can also refer to memories, such as main memory 1108 and secondary memory 1110, which can be memory semiconductors (e.g., DRAMs, etc.).

Computer programs (also called computer control logic) are stored in main memory 1108 and/or secondary memory 1110. Computer programs can also be received via communication interface 1124. Such computer programs, when executed, enable computer system 1100 to implement the embodiments as discussed herein. In particular, the computer programs, when executed, enable processor device 1104 to implement the processes of the embodiments discussed here. Accordingly, such computer programs represent controllers of the computer system 1100. Where the embodiments are implemented using software, the software can be stored in a computer program product and loaded into computer system 1100 using removable storage drive 1114, interface 1120, and hard disk drive 1112, or communication interface 1124.

Embodiments of the present disclosure also can be directed to computer program products comprising software stored on any computer useable medium. Such software, when executed in one or more data processing device, causes a data processing device(s) to operate as described herein. Embodiments of the present disclosure can employ any computer useable or readable medium. Examples of computer useable mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

In some embodiments, the operation of PV disconnect device 200 can be controlled according to an adaptive feedforward control mode (e.g., in the form computer readable instructions) based on one or more inputs, such as, for example, an instantaneous PV power output, a current time of day, and/or a predicted PV power output. In some embodiments, the feedforward control mode can configure PV disconnect device 200 to disconnect backup PV power generation system 160 within a predetermined time range, such as, for example, from approximately 10 milliseconds to approximately 20 milliseconds, to expedite the response time of PV disconnect device 200. By expediting the response time of PV disconnect device 200, the adaptive feedforward control mode configures PV disconnect device 200 to disconnect backup PV power generation system 160 before a microgrid is formed when microgrid interconnection device 120 switches from on-grid mode to backup mode. For example, in some embodiments, when microgrid interconnection device 120 switches from on-grid mode to backup mode, a microgrid is formed between the plurality of backup loads 172 and energy storage system 150 in a time range from approximately 40 milliseconds to approximately 60 milliseconds, whereas PV disconnect device 200 disconnects backup PV power generation system 160 from energy control system 110 in a time range less than 40 milliseconds, such as for example, less than approximately 30 milliseconds (e.g., from approximately 10 milliseconds to approximately 20 milliseconds).

In some embodiments, the adaptive feedforward control mode can configure PV disconnect device 200 to be opened or closed for a predetermined time period. In some embodiments, the predetermined time period can be mapped in a lookup table according to one or more inputs (e.g., instantaneous PV power output and/or current time of day). For example, as shown in FIG. 12, a lookup table 1150 can reside in the form of computer readable instructions stored in the memory (e.g., ROM of main memory 1108) of computer system 1100 implemented in controller 122, PV monitoring system 130, and/or PV disconnect device 200 for controlling the operation of PV disconnect device 200. In some embodiments, as shown in FIG. 12, for example, lookup table 1150 can include a first field (e.g., column and/or row) 1152 listing values of PV power output, a second field (e.g., column and/or row) 1154 listing times of the day, a third field (e.g., column and/or row) 1156 listing predetermined time periods for keeping PV disconnect device 200 open or closed, and/or a fourth field (e.g., column and/or row) 1158 listing an estimated PV power output at the end of the predetermined time period. In some embodiments, PV disconnect device 200 can automatically be set in an open state or a closed state according to the predetermined time period listed in third field 1156 of lookup table 1150. In some embodiments, the estimated PV power output listed in fourth field 1158 can be updated according to a control algorithm that accounts for historical PV power output and forecast PV power output. Accordingly, the predetermined time periods can be adjusted over an extended period of time to account for feedback of electrical system 100.

Figure 13:
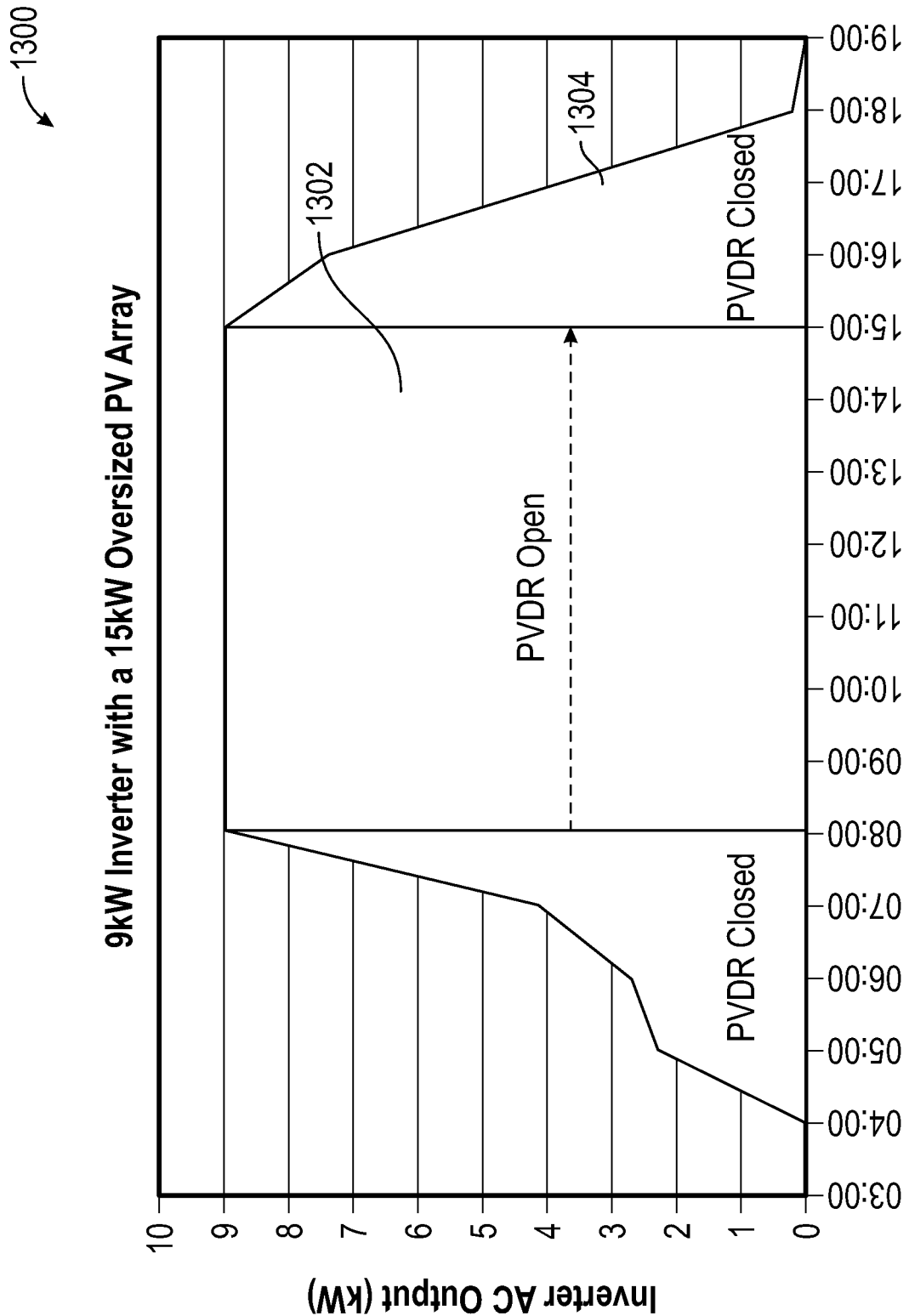
FIG. 13 illustrates a graph showing a PV power output profiled over a day of time according to an embodiment.

In some embodiments, the predetermined time periods listed in third field 1156 of lookup table 1150 can be based on PV power output profile graph 1300 shown in FIG. 13. In some embodiments, as shown in FIG. 13, PV power output profile graph 1300 can indicate a first time period 1302 when predicted backup PV power output is greater than a predicted load demand and/or available storage capacity of energy storage system 150, such as, for example, during the hours of maximum of solar exposure (e.g., from 8:00 am to 3:00 pm). In some embodiments, PV power output profile graph 1300 can indicate a second time period 1304 when the predicted backup PV power output is less than the predicted load demand by the plurality of backup loads 172 and/or available storage capacity of energy storage system 150, such as, for example, during the hours of limited solar exposure (e.g., 3:00 pm to 8:00 am). In some embodiments, the PV power output graph can be updated over time based on historical data. In some embodiments, the predetermined time periods listed in third field 1156 can range from approximately 5 minutes to approximately 24 hours, such as, for example, from approximately 1 hour to approximately 8 hours. For example, the predetermined time periods for opening PV disconnect device 200 during the morning of first time period 1302 can be greater than the predetermined time periods for opening PV disconnect device 200 during the afternoon of first time period 1302 to allow backup PV power generation system 160 to be disconnected when generating maximum power, ultimately preventing backup PV power generation system 160 from overloading the load demand of backup loads 172 and/or available storage capacity of energy storage system 150.

In operation under the feedforward control mode, a processor (e.g., processor device 1104) of controller 122, PV monitoring system 130, and/or PV disconnect device 200 can detect the instantaneous PV power output of backup PV power generation system 160 and/or the current time of day. In some embodiments, processor device 1104 can be configured to receive data indicating the instantaneous PV power output according to a predetermined sampling rate, such as for example, a sampling rate ranging from approximately 5 milliseconds to approximately 1 second, such as a 100 millisecond sampling rate. In some embodiments, processor device 1104 can determine the address (e.g., corresponding row and/or column) of first field 1152 in lookup table 1150 that corresponds to the detected instantaneous PV power output. In some embodiments, processor device 1104 can determine the address (e.g., corresponding row and/or column) of second field 1154 in lookup table 1150 that corresponds to the current time of the day. In some embodiments, processor device 1104 can determine the address (e.g., corresponding row and/or column) of third field 1156 in lookup table 1150 based on the determined address (e.g., corresponding row and/or column) of first field 1152 and/or the determined address (e.g., corresponding row and/or column) of second field 1154. In some embodiments processor device 1104 can keep PV disconnect device 200 in the open state or closed state according to the predetermined time period set forth in the determined address (e.g., corresponding row and/or column) of third field 1156 of lookup table 1150.

In some embodiments, the operation of PV disconnect device 200 can be controlled according to a dynamic control mode (e.g., in the form computer readable instructions). In some embodiments, the dynamic control mode can configure PV disconnect device 200 to open or close based on a control algorithm that accounts for one or more operating conditions, such as, for example, voltage, current, and/or frequency of AC across the feed circuit 168 of backup PV power generation system 160. In some embodiments, dynamic control mode configures PV disconnect device 200 to open or close according, for example, to method 1000 shown in FIG. 10.

In some embodiments, processor device 1104 can be configured to determine whether to operate PV disconnect device 200 in the feedforward control mode or in the dynamic control mode based on one or more inputs. For example, processor device 1104 can determine whether to operate PV disconnect device 200 is in the feedforward control mode or the dynamic mode based on the detected instantaneous PV power output of backup PV power generation system 160. In some embodiments, when detecting a grid outage and/or when detecting that microgrid interconnection device 120 has switched to backup mode, processor device 1104 can be configured to operate in the feedforward control mode when the instantaneous PV power output exceeds a first PV output threshold and in the dynamic control mode when the instantaneous PV power output falls below the first PV output threshold. In some embodiments, the first PV output threshold can range from approximately 7 kW to approximately 10 kW, such as, for example 7.5 kW. The first PV output threshold can be determined based on the power rating of backup PV power generation system 160, storage capacity of energy storage system 150, and/or load demand of the plurality of backup loads 172. In some embodiments, when microgrid interconnection device 120 is operating in on-grid mode, processor device 1104 can be configured to operate in the feedforward control mode when the instantaneous PV power output exceeds a second PV output threshold and in the dynamic control mode when the instantaneous PV power output falls below the second PV output threshold. In some embodiments, the second PV output threshold can range from approximately 6 kW to approximately 10 kW, such as, for example 7 kW.

Figure 14:
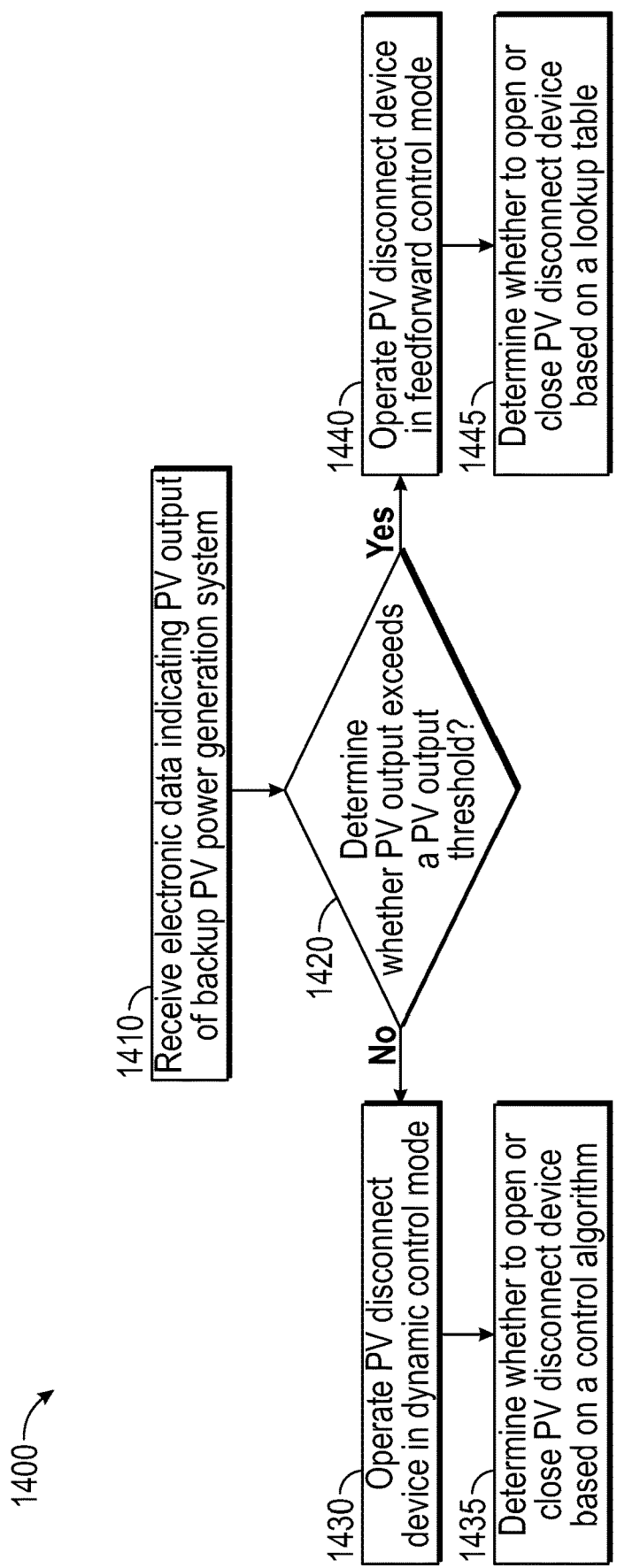
FIG. 14 illustrates a block diagram showing a method of controlling a PV disconnect device according to an embodiment.

FIG. 14 shows an example block diagram illustrating a method 1400, according to an embodiment, of controlling a PV disconnect device (e.g., PV disconnect device 200, a first PV disconnect device 200A, and/or a second PV disconnect device 200B) by a controller, such as, for example, controller 122, PV monitoring system 130, and/or relay controller 260. One or more aspects of method 1400 can be implemented using hardware, software modules, firmware, tangible computer readable media having instructions stored thereon, or a combination thereof and can be implemented in one or more computer systems or other processing systems (e.g., computer system 1100).

In some embodiments, method 1400 can include a step 1410 of receiving electronic data indicating an instantaneous PV power output of backup PV power generation system 160. In some embodiments, step 1410 can including using PV monitoring system 130 to receive PV power output measurements at a sampling rate between approximately 10 milliseconds and approximately 1 second, such as, for example, a sampling rate of 100 milliseconds.

In some embodiments, method 1400 can include a step 1420 of determining whether the instantaneous PV power output of backup PV power generation system 160 exceeds a PV output threshold. In some embodiments, the PV output threshold in step 1420 can include a first PV output threshold when detecting a grid outage and/or when detecting that microgrid interconnection device 120 has switched to backup mode. In some embodiments, the PV output threshold in step 1420 can include a second PV output threshold when microgrid interconnection device 120 is operating in on-grid mode. In some embodiments, the first PV output threshold can be less than or greater than the second PV output threshold. In some embodiments, the first PV output threshold can range from approximately 7 kW to approximately 10 kW, such as, for example 7.5 kW. In some embodiments, the second PV output threshold can range from approximately 6 kW to approximately 10 kW, such as, for example 7 kW.

In some embodiments, when step 1420 indicates that the instantaneous PV power output is less than the PV output threshold, method 1400 can include a step 1430 of operating PV disconnect device in dynamic control mode. In some embodiments, step 1430 can include receiving electronic data related to backup PV power generation system 160, energy storage system 150, utility grid 184, the plurality of backup loads 172, and/or non-backup loads 174. For example, in some embodiments, electronic data related to backup PV power generation system 160 can include a detected power output of backup PV power generation system 160. In some embodiments, electronic data related to backup PV power generation system 160 can include a frequency of the power supplied by backup PV power generation system 160. In some embodiments, electronic data related to energy storage system 150 can include an available storage capacity. In some embodiments, electronic data related to the plurality of backup loads 172 can include a current backup load demand. In some embodiments, electronic data related to the plurality of non-backup loads 174 can include a current non-backup load demand. In some embodiments, electronic data related to utility grid 184 can include an operating status of utility grid 184 electrically coupled to microgrid interconnection device 120 (e.g., grid-tied or power outage).

In some embodiments, method 1400 can include a step 1435 of determining whether to open or close PV disconnect device 200 based on a control algorithm. For example, in some embodiments, the control algorithm can determine how long to open or close PV disconnect device 200 based on the received electronic data related to backup PV power generation system 160, energy storage system 150, utility grid 184, the plurality of backup loads 172, and/or non-backup loads 174. In some embodiments, the control algorithm includes determining whether the monitored electronic data indicates a power deviation event, such as the algorithms used in step 1020 of method 1000. For example, a power deviation event can be when power supplied to backup power bus 140 exceeds a threshold (e.g., 120% of bus bar rating) that would overload electrical system 100. In some embodiments, a power deviation event occurs when the power output of backup PV power generation system 160 is greater than the available storage capacity of energy storage system 150.

In some embodiments, when step 1420 indicates that the instantaneous PV power output is greater than the PV output threshold, method 1400 can include a step 1440 of operating PV disconnect device in feedforward control mode. In some embodiments, step 1440 includes detecting the instantaneous PV power output of backup PV power generation system 160 and the current time of the day. In some embodiments, step 1440 can include reading lookup table 1150 stored in memory of processor device 1104.

In some embodiments, method 1400 can include a step 1445 of determining whether to open or close PV disconnect device 200 based on lookup table 1150. In some embodiments, step 1445 can include determining the address (e.g., corresponding row and/or column) of first field 1152 in lookup table 1150 that corresponds to the detected instantaneous PV power output. In some embodiments, step 1445 can include determining the address (e.g., corresponding row and/or column) of second field 1154 in lookup table 1150 that corresponds to the current time of the day. In some embodiments, step 1445 can include determining the address (e.g., corresponding row and/or column) of third field 1156 in lookup table 1150 based on the determined address (e.g., corresponding row and/or column) of first field 1152 and/or the determined address (e.g., corresponding row and/or column) of second field 1154. In some embodiments, step 1445 can include keeping PV disconnect device 200 in the open state or closed state according to the predetermined time period set forth in the determined address (e.g., corresponding row and/or column) of third field 1156 of lookup table 1150.

It is to be appreciated that the Detailed Description section, and not the Summary and Abstract sections, is intended to be used to interpret the claims. The Summary and Abstract sections may set forth one or more but not all exemplary embodiments of the present embodiments as contemplated by the inventor(s), and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A photovoltaic (PV) disconnect device, comprising:
a relay component electrically coupled to a feed circuit of a backup PV power generation system;
a sensor circuit configured to measure a first phase line-to-neutral voltage and a second phase line-to-neutral voltage of the feed circuit of the backup PV power generation system;
a connector port electrically coupled to a backup power bus of an energy control system; and
a controller operatively coupled to the relay component, the sensor circuit, and the connector port, wherein the controller is configured to receive and process the first phase line-to-neutral voltage and the second phase line-to-neutral voltage measurements from the sensor circuit, and wherein the processing the voltage measurements comprises comparing the first phase line-to-neutral voltage and the second phase line-to-neutral voltage measurements to a voltage rating of the backup power bus of the energy control system, and
wherein the controller is configured to selectively actuate the relay component to electrically disconnect the feed circuit of the backup PV power generation system from the backup power bus of the energy control system when the processed first phase line-to-neutral voltage measurement or the second phase line-to-neutral voltage measurement exceeds a threshold voltage, and the threshold voltage is based on the voltage rating of the backup power bus of the energy control system.

2. The PV disconnect device of claim 1, wherein the relay component comprises:
a first relay electrically coupled to a first line of the feed circuit;
a second relay electrically coupled to a second line of the feed circuit; and
a relay driver configured to energize the first relay and the second relay such that the first and second relays electrically disconnect the first and second lines of the feed circuit from the energy control system.

3. The PV disconnect device of claim 1, wherein the controller is configured to selectively actuate the relay component based on the processed first phase line-to-neutral voltage and the second phase line-to-neutral voltage within a predetermined response time range.

4. The PV disconnect device of claim 3, wherein the predetermined response time range is a range from approximately 10 milliseconds to approximately 30 milliseconds.

5. The PV disconnect device of claim 1, further comprising a printed circuit board, and wherein the relay component, the sensor circuit, the connector port, and the controller are coupled to the printed circuit board.

6. The PV disconnect device of claim 1, wherein the controller is configured to determine the direction of current flowing through the relay component.

7. The PV disconnect device of claim 6, wherein the controller is configured to indicate a warning when a reversed direction of current is flowing through the relay component.

8. The PV disconnect device of claim 1, wherein the relay component is an electromechanical relay.

9. The PV disconnect device of claim 1, wherein the relay component is a solid-state relay.

10. A photovoltaic (PV) disconnect device, comprising:
a relay component electrically coupled to a feed circuit of a backup PV power generation system;
a sensor circuit configured to measure a current frequency of the feed circuit of the backup PV power generation system;
a connector port electrically coupled to a backup power bus of an energy control system; and
a controller operatively coupled to the relay component, the sensor circuit, and the connector port, wherein the controller is configured to receive and process the measured current frequency from the sensor circuit, and wherein processing the measured current frequency comprises comparing the measured current frequency to a setpoint frequency to detect an abnormal frequency event,
wherein the relay component is configured to switch from a closed position to an open position to electrically disconnect the feed circuit of the backup PV power generation system from the backup power bus of the energy control system,
wherein the controller is configured to selectively actuate the relay component to the open position for a predetermined time period based on a detection of the abnormal frequency event, and the predetermined time period is adjusted according to electronic data related to the energy control system.

11. The PV disconnect device of claim 10, wherein the processing of the measured current frequency further comprises tracking the number of detected abnormal frequency events within a set time period.

12. The PV disconnect device of claim 11, wherein the controller is configured to selectively actuate the relay component when the tracked number of detected abnormal frequency events within the set time period is greater than a predetermined threshold.

13. The PV disconnect device of claim 11, wherein the set time period is in a range from approximately 10 milliseconds to approximately 5 seconds.

14. The PV disconnect device of claim 10, wherein the controller is configured to selectively actuate the relay component based on the detection of the abnormal frequency event within a predetermined response time range.

15. The PV disconnect device of claim 14, wherein the predetermined response time range is a range from approximately 10 milliseconds to approximately 30 milliseconds.

16. The PV disconnect device of claim 10, wherein the relay component is an electromechanical relay.

17. The PV disconnect device of claim 10, wherein the relay component is a solid-state relay.

18. The PV disconnect device of claim 10, wherein the electronic data indicates a state of an energy storage system electrically coupled to the backup power bus of the energy control system.

19. The PV disconnect device of claim 10, wherein the electronic data indicates a state of the backup PV power generation system.

* * * * *